US012681552B2

(12) United States Patent (10) Patent No.: US 12,681,552 B2
Rajwan et al. (45) Date of Patent: Jul. 14, 2026

(54) MULTI-PROCESSOR POWER MANAGEMENT CIRCUIT

(71) Applicant: Apple Inc., Cupertino, CA (US)

(72) Inventors: Doron Rajwan, Rishon LeZion (IL);
John H. Kelm, Belmont, CA (US);
Michael Bekerman, Los Gatos, CA
(US)

(73) Assignee: Apple Inc., Cupertino, CA (US)

( * ) Notice: Subject to any disclaimer, the term of this
patent is extended or adjusted under 35
U.S.C. 154(b) by 283 days.

(21) Appl. No.: 18/540,798

(22) Filed: Dec. 14, 2023

(65) Prior Publication Data

US 2025/0093937 A1 Mar. 20, 2025

Related U.S. Application Data

(60) Provisional application No. 63/582,820, filed on Sep.
14, 2023.

(51) Int. Cl.
*G06F 1/32* (2019.01)
*G06F 1/3234* (2019.01)

(52) U.S. Cl.
CPC .................................. *G06F 1/3234* (2013.01)

(58) Field of Classification Search
CPC ..................................... G06F 1/26; G06F 1/32
See application file for complete search history.

(56) References Cited

U.S. PATENT DOCUMENTS

| | | | |
|---|---|---|---|
| 6,442,700 B1 * | 8/2002 | Cooper .................... | G06F 1/206 |
| | | | 713/323 |
| 7,735,030 B1 | 6/2010 | Kalil et al. | |
| 7,984,317 B2 | 7/2011 | Conroy et al. | |
| 2008/0077815 A1 | 3/2008 | Kanakogi | |
| 2008/0307240 A1 * | 12/2008 | Dahan ...................... | G06F 1/324 |
| | | | 713/320 |
| 2010/0231044 A1 * | 9/2010 | Tatsumi ................ | G06F 1/3287 |
| | | | 307/39 |
| 2011/0078463 A1 * | 3/2011 | Fleming ................ | G06F 1/3203 |
| | | | 713/300 |
| 2011/0213991 A1 | 9/2011 | Wolfe et al. | |
| 2011/0276812 A1 * | 11/2011 | Lee ....................... | G06F 1/3203 |
| | | | 713/300 |
| 2012/0166852 A1 | 6/2012 | Sodhi et al. | |

(Continued)

FOREIGN PATENT DOCUMENTS

CN 104795098 A 7/2015

*Primary Examiner* — Phil K Nguyen
(74) *Attorney, Agent, or Firm* — Kowert, Hood, Munyon,
Rankin & Goetzel, P.C.; Scott W. Pape; Dean M. Munyon

(57) ABSTRACT

A system includes a power management processor that may
be configured to monitor operation of one or more circuit
blocks in the system, and to determine a particular perfor-
mance state of a set of performance states for one or more
power domains in the system based on the monitored
operation. The system further includes a performance man-
agement circuit that may be configured to receive, from the
power management processor, an indication of the particular
performance state. The performance management circuit
may further be configured to determine a transition path
from a current performance state to the particular perfor-
mance state that avoids illegal performance state transitions,
and to cause a control circuit to transition to the particular
performance state using the transition path.

20 Claims, 14 Drawing Sheets

System 100

(56)        References Cited

U.S. PATENT DOCUMENTS

| 2013/0258926 | A1* | 10/2013 | Osakada | ............... | H04W 52/04 |
| | | | | | 370/311 |
| 2014/0277815 | A1 | 9/2014 | Hanumaiah et al. | | |
| 2015/0095677 | A1 | 4/2015 | Bibikar et al. | | |
| 2016/0378160 | A1 | 12/2016 | Muralidhar et al. | | |
| 2017/0364140 | A1* | 12/2017 | Banerjee | ............... | G06F 1/3206 |
| 2018/0067542 | A1* | 3/2018 | Avoinne | ................ | G06F 1/3206 |
| 2018/0301120 | A1* | 10/2018 | Thaploo | ................... | G06F 3/14 |
| 2020/0285294 | A1 | 9/2020 | Rajwan et al. | | |
| 2020/0310994 | A1* | 10/2020 | ChoFleming | ....... | G06F 15/8007 |
| 2021/0055921 | A1 | 2/2021 | Sebot et al. | | |
| 2021/0303053 | A1* | 9/2021 | Lake | .................... | G06F 1/3206 |
| 2022/0200584 | A1 | 6/2022 | Pirozzi et al. | | |
| 2022/0326757 | A1 | 10/2022 | Sydir et al. | | |
| 2023/0093426 | A1* | 3/2023 | Masters | ............... | G06F 1/3234 |
| | | | | | 713/400 |

* cited by examiner

System 100

System 200

State Diagram 300a
State Diagram 300b
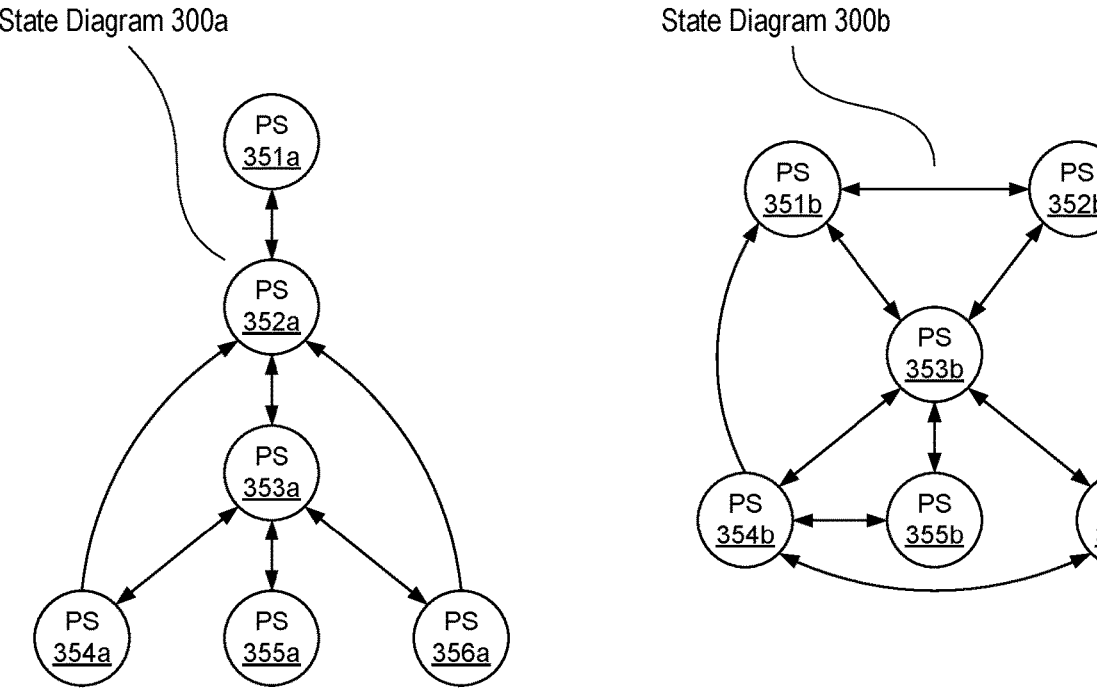
State Diagram 300c
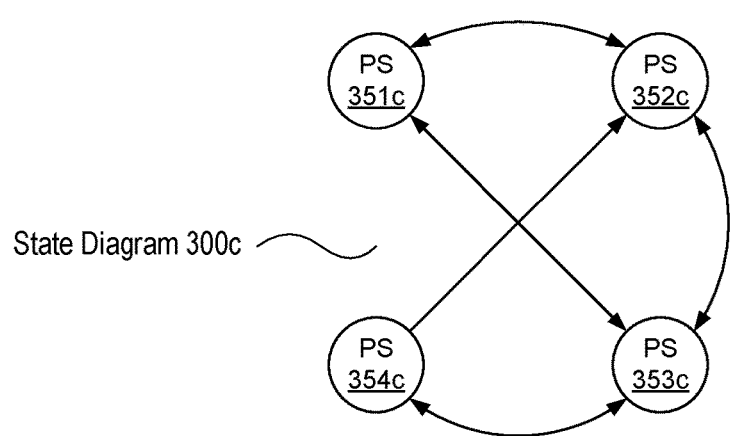
*FIG. 3*

System 400

| State Request Registers 410 | | | |
|---|---|---|---|
| register 410a | | | |
| PD a 415a | PD b 416a | PD c 417a | ACK 420a |
| register 410b | | | |
| PD a 415b | PD b 416b | PD c 417b | ACK 420b |
| register 410c | | | |
| PD a 415c | PD b 416c | PD c 417c | ACK 420c | reg 410a requests PS 355a for PD 240a; path = PS 352a->PS 353a->PS 355a reg 410b requests PS 356a for PD 240a; path = PS 355a->PS 353a->PS 356a Chart 460

System 500

System 700
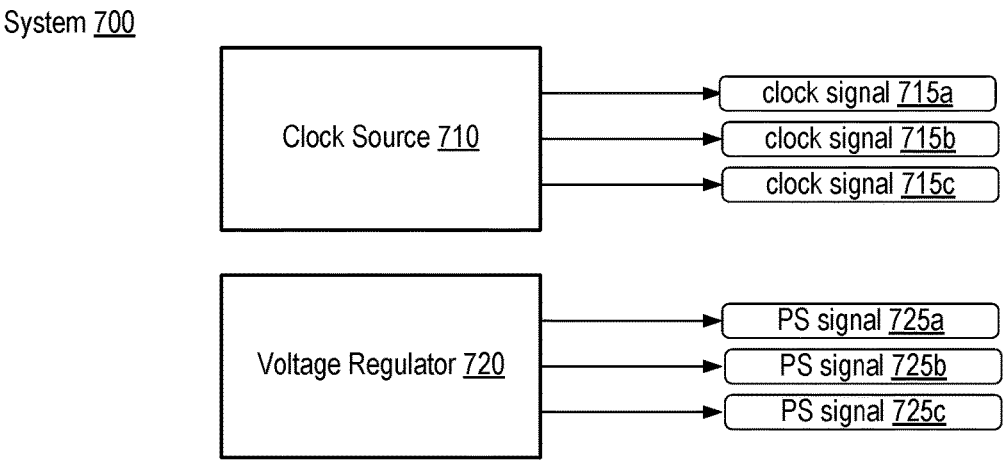
Chart 760
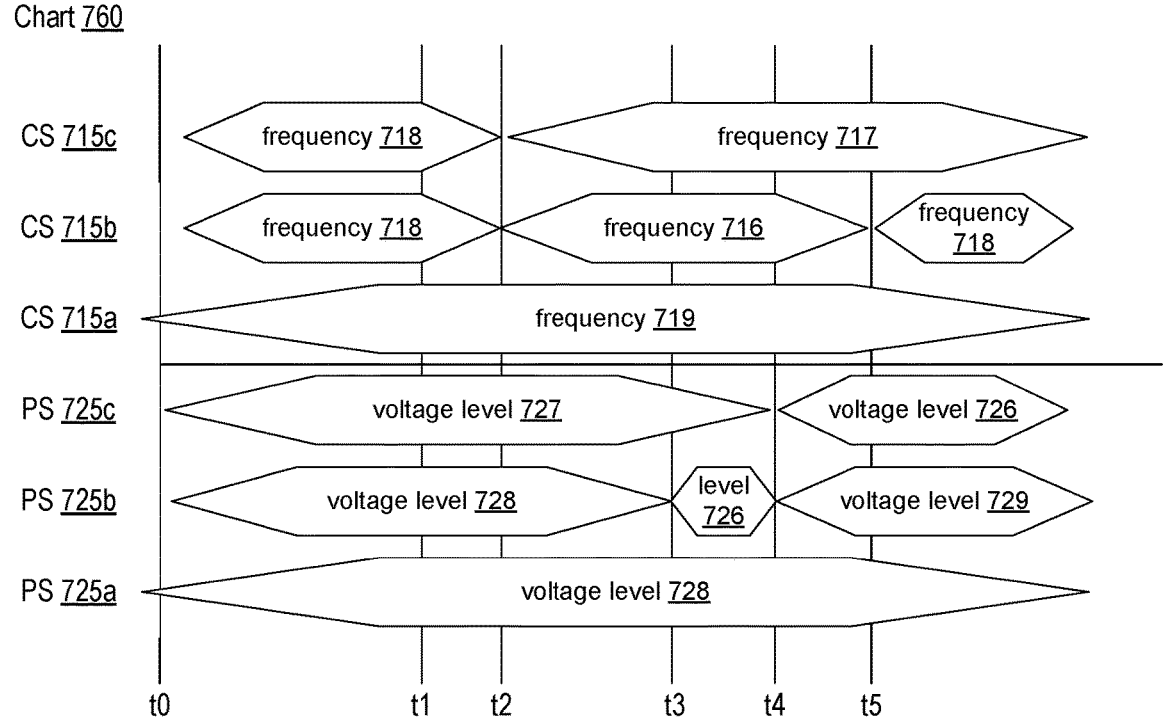
*FIG. 7*

800

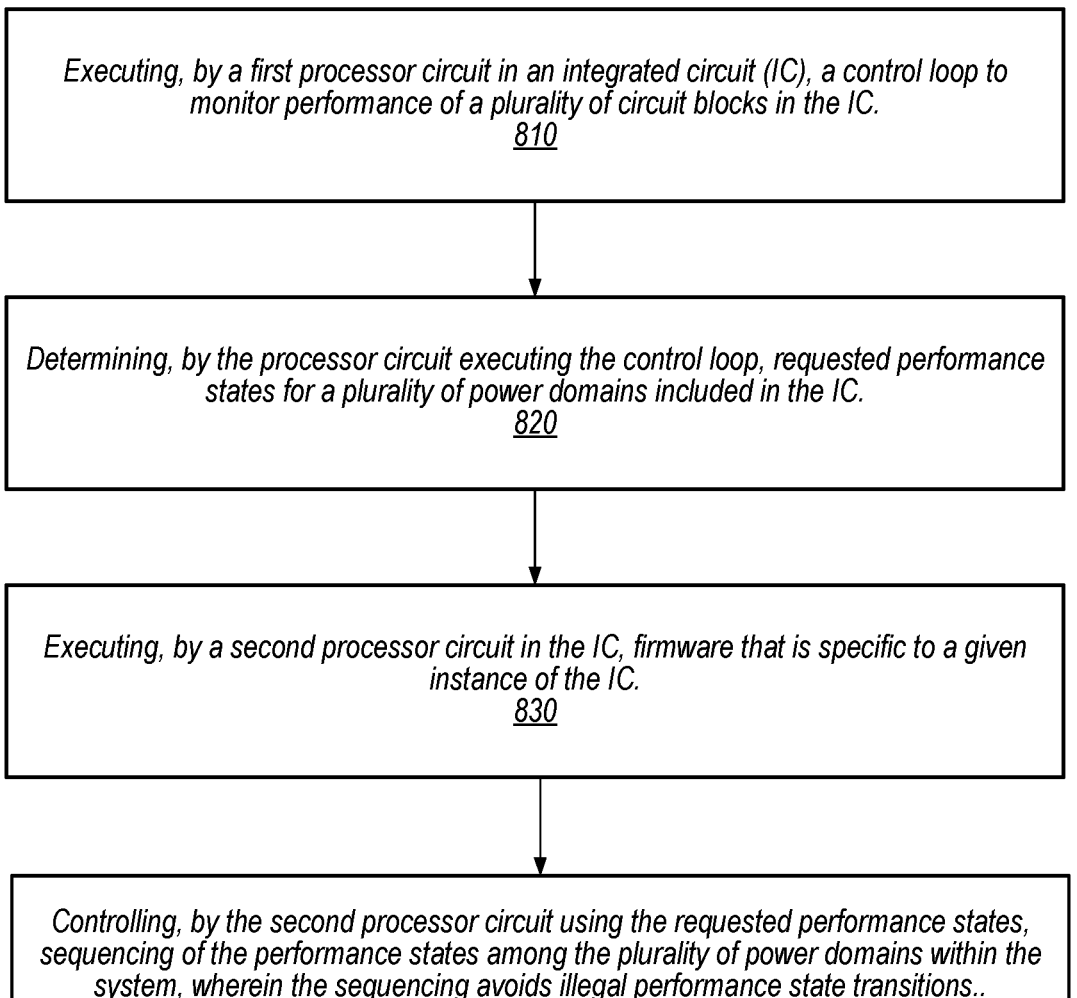

Executing, by a first processor circuit in an integrated circuit (IC), a control loop to monitor performance of a plurality of circuit blocks in the IC.
810

Determining, by the processor circuit executing the control loop, requested performance states for a plurality of power domains included in the IC.
820

Executing, by a second processor circuit in the IC, firmware that is specific to a given instance of the IC.
830

Controlling, by the second processor circuit using the requested performance states, sequencing of the performance states among the plurality of power domains within the system, wherein the sequencing avoids illegal performance state transitions..
840

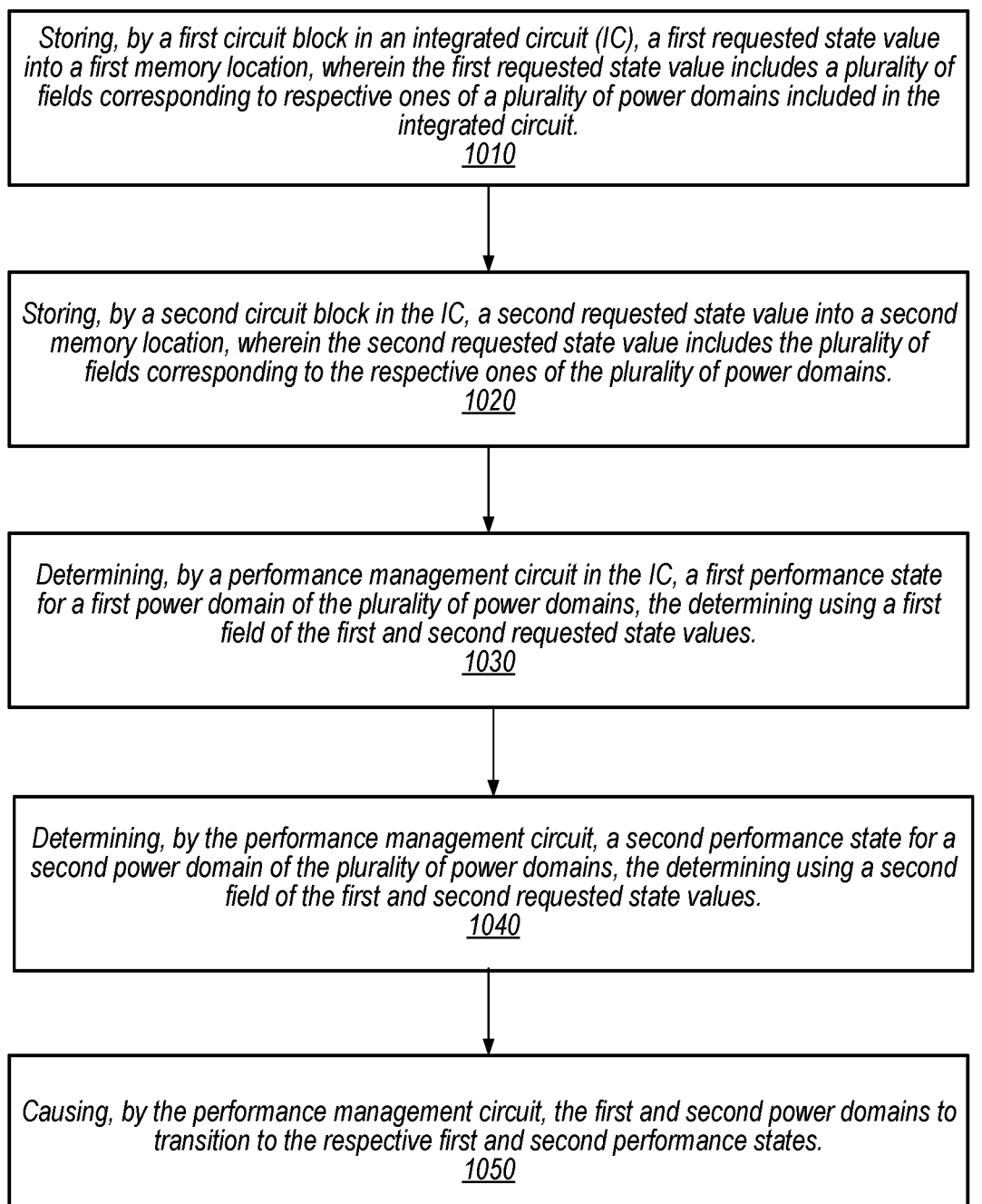

Storing, by a first circuit block in an integrated circuit (IC), a first requested state value into a first memory location, wherein the first requested state value includes a plurality of fields corresponding to respective ones of a plurality of power domains included in the integrated circuit.
<u>1010</u>

Storing, by a second circuit block in the IC, a second requested state value into a second memory location, wherein the second requested state value includes the plurality of fields corresponding to the respective ones of the plurality of power domains.
<u>1020</u>

Determining, by a performance management circuit in the IC, a first performance state for a first power domain of the plurality of power domains, the determining using a first field of the first and second requested state values.
<u>1030</u>

Determining, by the performance management circuit, a second performance state for a second power domain of the plurality of power domains, the determining using a second field of the first and second requested state values.
<u>1040</u>

Causing, by the performance management circuit, the first and second power domains to transition to the respective first and second performance states.
<u>1050</u>

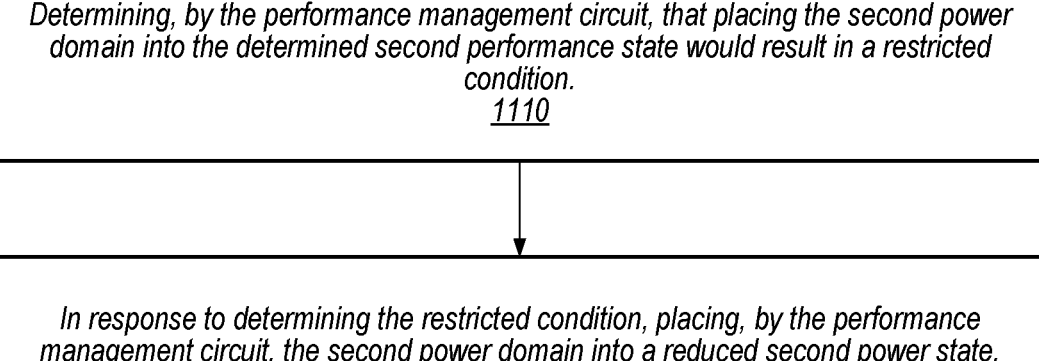

Determining, by the performance management circuit, that placing the second power domain into the determined second performance state would result in a restricted condition.
<u>1110</u>

In response to determining the restricted condition, placing, by the performance management circuit, the second power domain into a reduced second power state.
<u>1120</u>

In response to a determination that the number of circuit blocks in the IC operating in the second performance state in the second power domain is below the threshold number, placing, by the performance management circuit, the second power domain into an unrestricted second power state.
<u>1130</u>

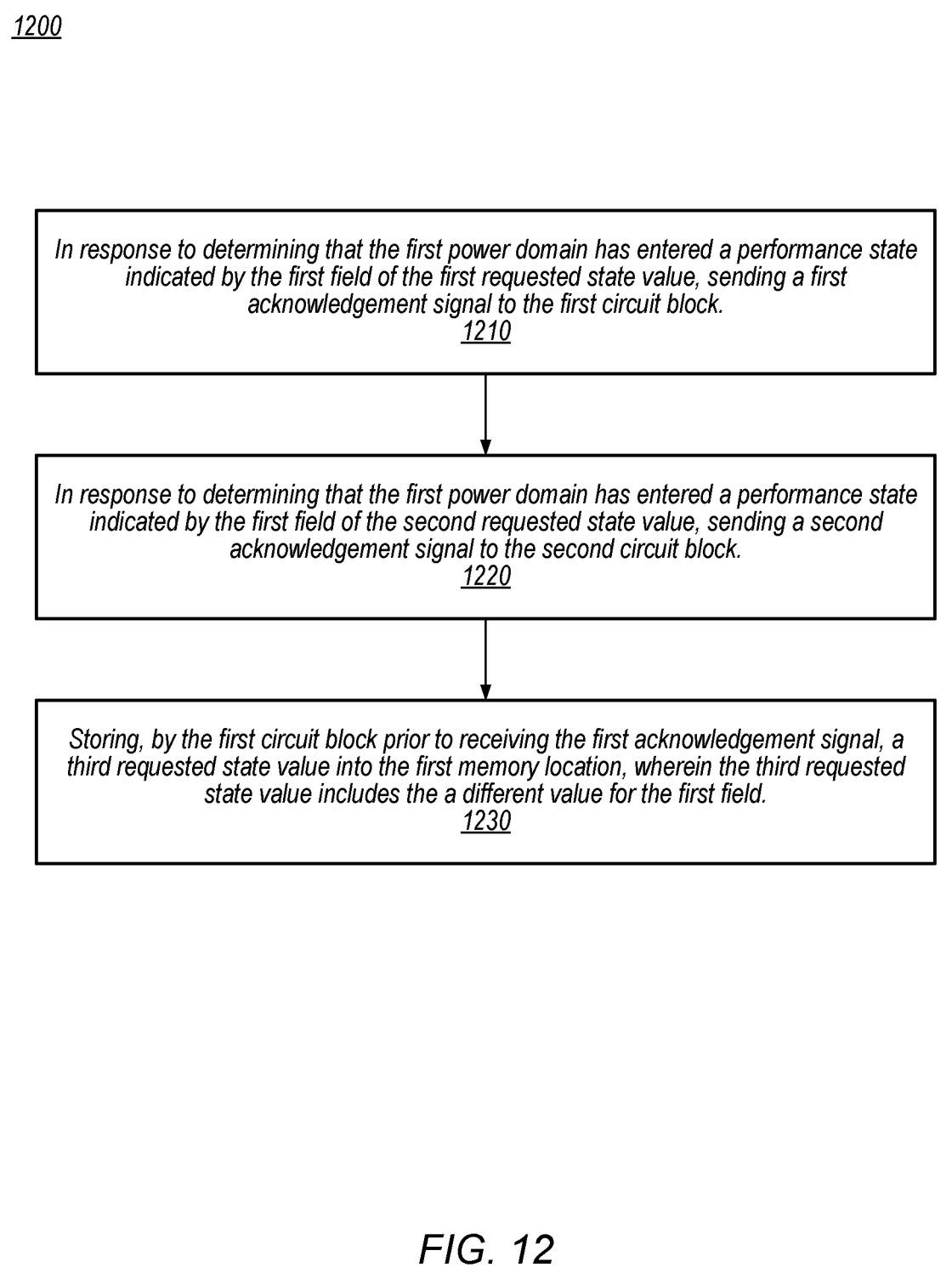

In response to determining that the first power domain has entered a performance state indicated by the first field of the first requested state value, sending a first acknowledgement signal to the first circuit block.
_1210_

In response to determining that the first power domain has entered a performance state indicated by the first field of the second requested state value, sending a second acknowledgement signal to the second circuit block.
_1220_

Storing, by the first circuit block prior to receiving the first acknowledgement signal, a third requested state value into the first memory location, wherein the third requested state value includes the a different value for the first field.
_1230_

_FIG. 12_

MULTI-PROCESSOR POWER MANAGEMENT CIRCUIT

The present application claims priority from U.S. Provisional App. No. 63/582,820, entitled "Multi-Processor Power Management Circuit," filed Sep. 14, 2023, the disclosure of which is incorporated by reference herein in its entirety.

BACKGROUND

Technical Field

Embodiments described herein are related to computing systems, including computer systems implemented as systems-on-a-chip (SoCs) and multichip packages. More particularly, embodiments are disclosed to techniques for managing power state transitions in a computer system.

Description of the Related Art

Computer systems, including systems-on-chip (SoCs) and multi-die chip packages, may utilize a variety of performance states to increase efficiency while performing a variety of tasks. For example, a multicore SoC may be capable of placing cores and/or core complexes independently into one of multiple performance state. As used herein, a "performance state" refers to a particular combination of operating parameters including, e.g., voltage levels of one or more power supply signals and frequencies of one or more clock signals. If a first core (or core complex) is performing a compute intensive task while a second core (or core complex) is performing a background task requiring less computational bandwidth, then the first core may be placed into a high-performance state to increase its ability to perform the compute intensive task while the second core is placed into a lower performance state with enough capability to perform the background task without consuming excess power and/or generating excess heat. In an SoC with a number of cores and other circuit blocks with configurable performance states, the various circuits may be placed into appropriate performance states for completing tasks while limiting an overall system power consumption and/or thermal generation.

Although performance states may be set independently for the various circuits, some combinations of performance states may be restricted to avoid incompatible conditions, such as voltage mismatches, timing race conditions, and the like. In addition, an SoC may need additional circuitry and/or routing to support cases in which all circuits are placed into a highest performance state.

BRIEF DESCRIPTION OF THE DRAWINGS

The following detailed description makes reference to the accompanying drawings, which are now briefly described.

FIG. 3 depicts three state diagrams associated with various power domains in a system.

FIG. 7 depicts a block diagram of an embodiment of a clock source and a voltage regulator along with a chart depicting transitions between clock signal frequencies and power signal voltage levels.

FIG. 8 illustrates a flow diagram of an embodiment of a method for managing transition between performance states by a performance management circuit.

FIG. 10 shows a flow diagram of an embodiment of a method for using a set of state request registers to select performance states for a plurality of power domains.

FIG. 11 illustrates a flow diagram of an embodiment of a method for reducing a selected performance state in response to a restricted performance state transition.

FIG. 12 depicts a flow diagram of an embodiment of a method asserting acknowledgement signals in response to entering particular performance states.

Figure 1:
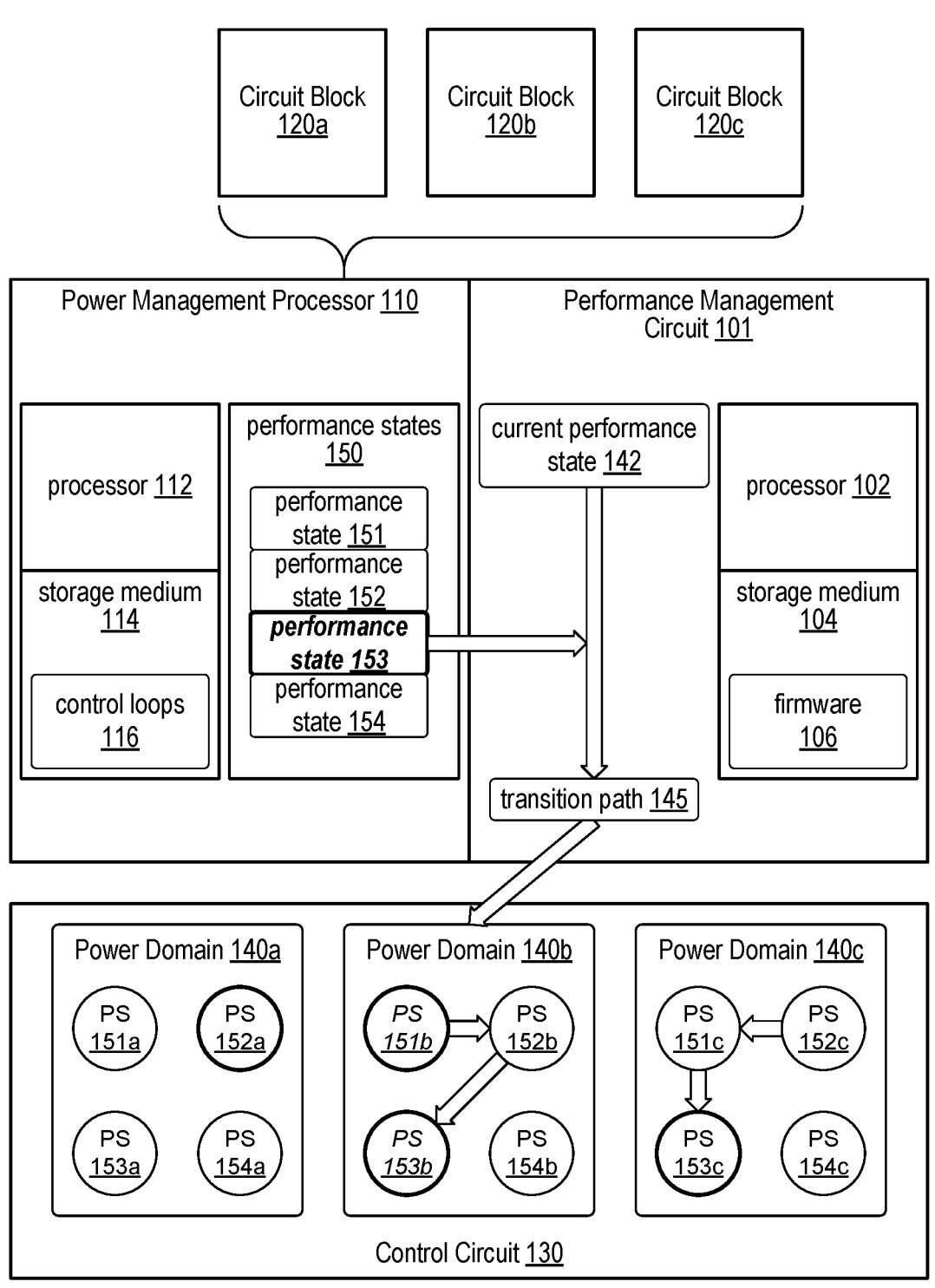
FIG. 1 illustrates a block diagram of an embodiment of a system that includes a power management processor and a performance management circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

Some SoCs with a need to manage performance states for multiple circuits may utilize a power manager circuit to control selection of performance states of the various circuits as well as managing transitions between the various performance states. In some power manager circuits, a processor with firmware controlled by an operating system (OS) determines power policy and uses state machines and or other control circuits for setting voltages of power signals and frequencies of clock signals, as well as preventing transitions to combinations of performance states that are illegal per the power policies. SoC designs continue to become more capable with increased numbers of various circuits, e.g., application processors, graphics processing units (GPUs), neural engines, security processors, and the like. Policies for transitioning and sequencing between performance states may increase with this increase in SoC complexity. Design of a new version of an existing SoC may require extensive modification of hardware state machines and control circuits that are capable of supporting more complex power policies. In addition, such hardware circuits may limit a flexibility of the new SoC to meet design goals across a range of applications requiring different sets of power policies.

Circuits and techniques are proposed herein for a power manager circuit that includes a power management processor and a performance management circuit. The power management processor may monitor operation of one or more circuit blocks (e.g., processor cores, GPUs, neural engines, displays, camera systems, sensor circuits, etc.) in a system, and determine a particular performance state for one or more power domains in the system based on the monitored operation. The performance management circuit may receive, from the power management processor, an indication of the particular performance state for the respective power domains and determine a transition path from a current performance state to the particular performance state that avoids illegal performance state transitions. Such a performance management system may further cause a control circuit to transition to the particular performance state using the determined transition path.

The performance management circuit in an SoC may provide a software interface for an OS, and/or applications running in the OS, to request performance states in various power domains, and then manage performance state sequencing to ensure that only legal combinations of performance states are entered, and that the required sequencing to change between performance states occurs. The power management processor may provide a link between the OS and applications to the performance management circuit. The OS may indicate high level determinations of what levels of performance are desired, the power management processor may identify a respective performance state for one or more power domains, and the performance management circuit may enable the transitions using hardware circuits for speed, reliability, consistency, and the like. SoC-specific requirements may be managed by the performance management circuit, insulating the OS and other software from such details, thereby allowing software to be used by a variety of hardware systems with few to no revisions.

The performance management circuit may be implemented as a dedicated hardware processor coupled to circuits for managing performance state transitions for a plurality of power domains. The performance management circuit may execute firmware created for a specific SoC design based on capabilities and limitations of the specific SoC design. The power management processor, in some embodiments, may be implemented in software or firmware using one of a plurality of processor cores in a multicore system. In such embodiments, the power management processor may be implemented as a software driver associated with a particular OS. In other embodiments, the power management processor may be a dedicated processor executing firmware specific to the dedicated processor. In such embodiments, this dedicated processor may be closely coupled to the performance management circuit to provide a fast and reliable interface between processes and circuits performing tasks in the SoC to the circuits that physically change operating parameters associated with a given performance state.

For the ease of discussion, various embodiments in this disclosure are described as being implemented using one or more SoCs. It is to be understood that any disclosed SoC can also be implemented using a chiplet-based architecture. Accordingly, wherever the term "SoC" appears in this disclosure, those references are intended to also suggest embodiments in which the same functionality is implemented via a less monolithic architecture, such as via multiple chiplets, which may be included in a single package in some embodiments.

On a related note, some embodiments may include more than one SoC. Such architectures are to be understood to encompass both homogeneous designs (in which each SoC includes identical or almost identical functionality) and heterogeneous designs (in which the functionality of each SoC diverges more considerably). Such disclosure also contemplates embodiments in which the functionalities of the multiple SoCs are implemented using different levels of discreteness. For example, the functionality of a first system could be implemented on a single IC, while the functionality of a second system (which could be the same or different than the first system) could be implemented using a number of co-packaged chiplets.

FIG. 1 illustrates a block diagram of an embodiment of a computer system that uses a performance management circuit to sequence a plurality of power domains between a plurality of performance states. System 100 includes a plurality of circuit blocks 120a-120c (collectively 120), coupled to power management processor 110 which, in turn, is coupled to performance management circuit 101. Performance management circuit 101 is further coupled to control circuit 130 that enables changes of performance states for power domains 140a-140c (collectively 140). In some embodiments, system 100 may be implemented using one or more integrated circuits, which may be included in a computing system, such as a desktop or laptop computer, a smartphone, a tablet computer, a wearable smart device, or the like.

Circuit blocks 120 may include CPUs, GPUs, neural processing engines, various peripherals, memory controllers, displays, camera and other sensors, and the like. As such, circuit blocks 120 may perform a wide variety of tasks, with tasks ranging from simpler background tasks to more intensive computational tasks. For example, a neural processing engine may be used to receive and interpret voice commands of a user of a device that includes system 100. During the voice reception and interpretation, neural processing engines may require a highest available performance state to complete the tasks in a short amount of time based on user expectations. Accordingly, one or more power domains associated with the neural processing engine may need higher power signal voltage levels and/or higher clock signal frequencies to support the highest available performance state. A display and a GPU at this same time may have a very simple image to display and, therefore, may be capable of supporting the display of the simple image using a mid-range or low-range performance state, thereby saving power and reducing contributions to thermal output.

As illustrated, power management processor 110 is configured to monitor operation of circuit blocks 120 in system 100. For example, power management processor 110 may be capable of detecting when the neural processing engine is receiving and interpreting voice input as well as determine that the GPU and display have lower performance requirements. Accordingly, power management processor 110 may determine a particular one of performance states 150 for one or more power domains 140 in system 100 based on the monitored operation. In some embodiments, to monitor the operation of circuit blocks 120, power management processor 110 may be further configured to receive a respective performance state request from a subset of circuit blocks 120. Each performance state requests may indicate a desired performance state 150 for one or more of power domains 140. For example, circuit block 120a may send a performance state request specific to power domain 140c. Circuit block 120b may send a performance state request specific to power domains 140a and 140c, while circuit block 120c may send a performance state request for all power domains 140. Power management processor 110 may, based on the received performance state requests, select performance state 152 for power domain 140*b*, and provide an indication of this selection to performance management circuit 101.

In some embodiments, power management processor 110 may include a computer accessible storage medium 114 storing instructions comprising one or more operating system control loops 116 executable to monitor and manage power and performance in a system. Control loops 116 may establish requested performance states 150 for one or more of power domains 140. Power management processor 110 may also include processor 112 configured to execute the one or more operating system control loops 116. In some embodiments, control loops 116 may cause power management processor 110 to monitor activity in circuit blocks 120, and determine performance requirements based on observations of this activity. In other embodiments, circuit blocks 120 may send requests to power management processor 110, these requests indicative of a performance state a requesting one of circuit blocks 120 is in, or will be entering.

Performance management circuit 101, as shown, may be configured to receive, from power management processor 110, the indication of the selection of performance state 153 for power domain 140*b*. Using this indication, performance management circuit 101 may determine transition path 145 from current performance state 142 to the selected performance state 153 that avoids illegal performance state transitions. As shown, current performance state 142 for power domain 140*b* is performance state 151*b*. Performance management circuit 101 may determine that transition path 145 is performance state 151*b* to performance state 152*b* and then to the selected performance state 153*b*. Performance management circuit 101 may then cause control circuit 130 to transition to performance state 152*b* using transition path 145.

In some embodiments, performance management circuit 101 may include a computer accessible storage medium 104 storing instructions comprising firmware 106 that is specific to a given implementation of system 100. The instructions of firmware 106 may control sequencing of performance states 150 among power domains 140 based on the performance states 150 requested by control loops 116. Performance management circuit 101 may also include processor 102 configured to execute firmware 106 and control hardware circuitry (e.g., control circuit 130) to perform the sequencing. Firmware 106 may be created during a design of system 100 with knowledge of limitations of system 100, including, for example, power supplies, clock circuits, chip-routing limitations, a total number of circuit blocks in the system, total chip-level power budgets, and similar details that may contribute to power distribution limitations across power domains 140. By executing firmware 106, performance management circuit 101 may be capable of determining a particular combination of operating conditions for various ones of performance states 150 that do not exceed limitations of circuits in system 100. In addition, performance management circuit 101 may also be capable of determining transition path 145 that avoids restricted combinations of performance states 150 across power domains 140. For example, information relevant to the restricted combinations may be included in firmware 106.

By dividing tasks associated with selecting performance states from setting operating parameters and sequencing transitions between performance states, details associated with the various performance states may be abstracted from specific hardware circuit designs, allowing software/firmware for a power management processor to be written in a hardware-independent manner using abstracted indications of performance states, thereby increasing portability of software across multiple hardware platforms. Firmware for a performance management circuit may be written for specific hardware platforms to map the abstracted indications of performance states to particular sets of operational parameters that are suitable for the specific hardware platform.

It is noted that the system of FIG. 1, is merely an example. System 100 has been simplified to highlight features relevant to this disclosure. Elements not used to describe the details of the disclosed concepts have been omitted. For example, system 100 may include various additional circuits that are not illustrated, such as one or more power supply circuits, clock management circuits, memory circuits, and the like. Although only three circuit blocks, three power domains, and four performance states are shown, any suitable number of such elements may be included in a given system.

In FIG. 1, power management processor 110 is described as monitoring operation of circuit blocks 120 and determining a particular performance state. Such monitoring and determining may be implemented in a variety of fashions. An example for determining performance states for a group of circuit blocks is depicted in FIG. 2.

Figure 2:
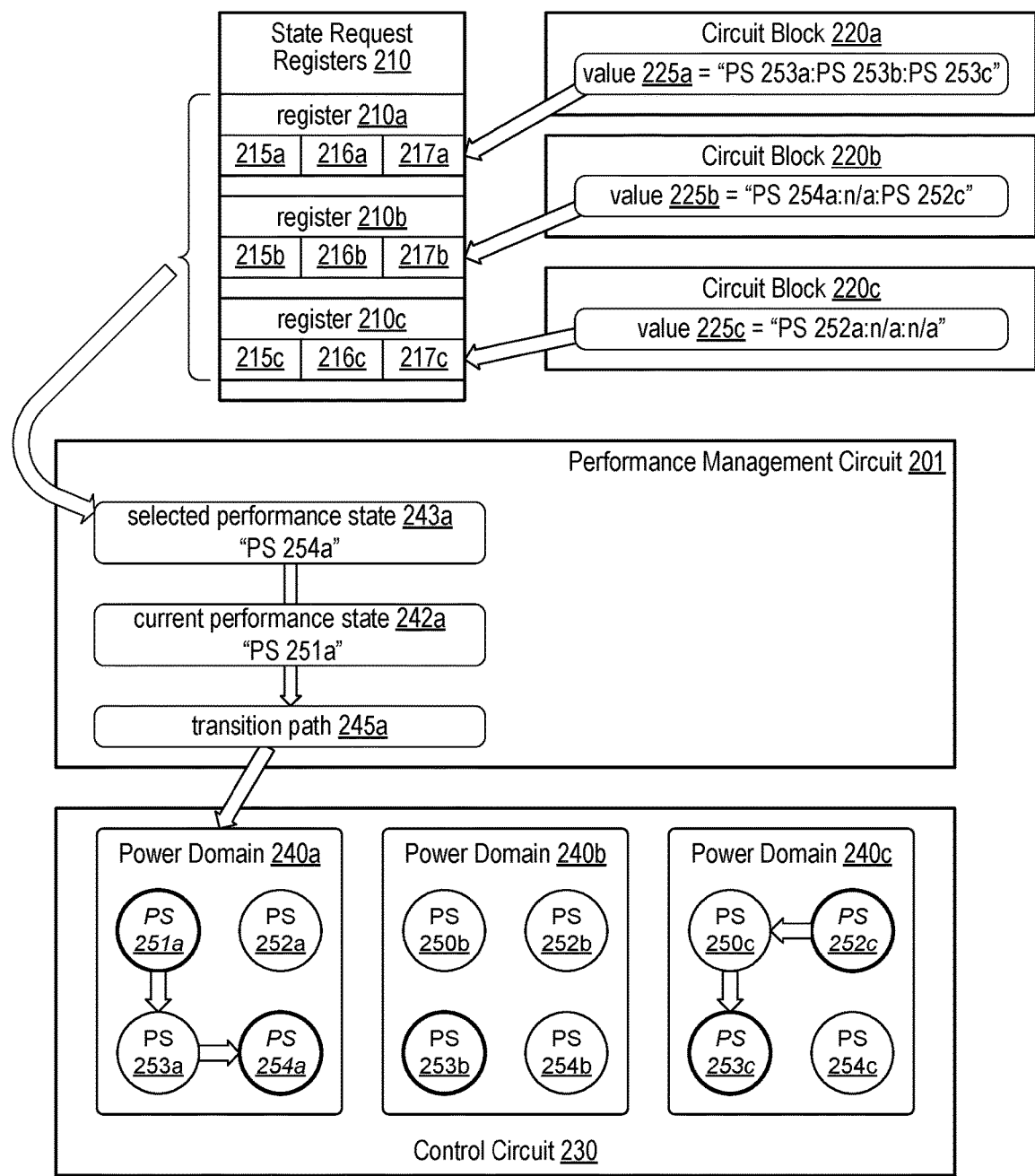
FIG. 2 shows a block diagram of an embodiment of a system that includes a set of state request registers and a performance management circuit.

Moving to FIG. 2, a block diagram of a system that includes state request registers is shown. System 200 includes performance management circuit 201, control circuit 230, circuit blocks 220*a*-220*c* (collectively 220), and state request registers 210. Control circuit 230 includes circuitry for sequencing power domains 240*a*-240*c* (collectively 240) through four performance states, PS 251 through PS 254. Like system 100 in FIG. 1, system 200 may be implemented using one or more integrated circuits, and may be included in a computing system, such as a desktop or laptop computer, a smartphone, a tablet computer, a wearable smart device, or the like.

Similar to control circuit 130 in FIG. 1, control circuit 230 may be configured to transition power domains 240 into selected ones of performance states 251-254 (further labeled "a," "b," or "c" for each of power domains 240*a*, 240*b*, and 240*c*, respectively). Control circuit 230 may include state machine or other logic circuits capable of transitioning, independently, each of power domains 240 between various ones of performance states 251-254. In some embodiments, such circuits or state machines may be different between two or more of power domains 240, based on power policies particular to each of power domains 240. Further details will be disclosed below in regards to FIG. 3.

As illustrated, system 200 includes state request registers 210. Each of state request registers 210 includes fields associated with respective ones of power domains 240. For example, register 210*a* includes field 215*a* for power domain 240*a*, field 216*a* for power domain 240*b*, and field 217*a* for power domain 240*c*. Registers 210*b* and 210*c* each include a respective set of fields 215, 216, and 217, each field similarly corresponding to one of power domains 240.

System 200, as shown, also includes circuit blocks 220 that may be configured to store respective state request values (e.g., values 225*a*-225*c*, collectively 225) into respective ones of state request registers 210. A given state request value 225 indicates a given requested performance state 251-254 for at least one of power domains 240. To store a respective state request value 225 into a respective state request register 210, a particular one of circuit blocks 220 is configured to store a particular value in a first field of the respective state request register 210, the first field associated with a first power domain of power domains 240. This particular value indicates a vote for an indicated performance state of performance states 251-254 for the first power domain. For example, circuit block 220b stores state request value 225b into register 210b. State request value 225b includes a value for field 215b that is indicative of a vote for performance state 254a for power domain 240a, and a value for field 217b that is indicative of performance state 252c for power domain 240c.

State request value 225b also includes an "n/a" value for field 216b. Circuit block 220b may also, as shown, store an abstain value (e.g., "n/a") in field 216b of state request register 210b, associated with power domain 240b. This "n/a" abstain value indicates no performance state preference for power domain 240b. For example, circuit block 220b may not utilize power domain 240b (either temporarily or permanently), or may be capable of performing a currently active or soon to be active task with power domain 240b in any one of performance states 251b-254b.

As illustrated, performance management circuit 201 is configured to select, using the associated fields in state request registers 210, a particular performance state of the requested performance states for at least one of power domains 240. To select a particular one of performance states 251a-254a for power domain 240a, for example, performance management circuit 201 may access values of 215a, 215b, and 215c from the respective state request registers 210. As shown, circuit block 220a voted for performance state 253a, circuit block 220b voted for performance state 254a, and circuit block 220c for performance state 252a. Performance management circuit 201 may use any suitable technique for selecting a performance state for power domain 240a based on fields 215a-215c. For example, performance management circuit 201 may select a highest performance state from the votes. As shown, performance state 254a may correspond to the highest of the requested performance states for power domain 240a.

In other embodiments, performance management circuit 201 may weight one or more votes based on the particular circuit block 220 that cast the vote. For example, circuit block 220a may correspond to a main application processor in system 200, e.g., may be the processor that executes an operating system for system 200. Accordingly, votes cast in register 210a that is associated with circuit block 220a may be weighted more heavily than votes cast in registers 210b and 210c. Any suitable formula may be used in conjunction with the weighted votes to select a particular one of the requested performance states. In some embodiments, weighting may be assigned dynamically based on particular tasks being performed by circuit blocks 220. For example, if system 200 is being used to play a video and circuit block 220b is a display circuit or GPU, then circuit block 220b may be assigned a higher priority/weighting while the video is being played. If circuit block 220c is a networking circuit (e.g., a Wi-Fi circuit), then a priority of circuit block 220c may be increased if the video is being streamed and video content in a streaming buffer falls below a threshold level.

Performance management circuit 201, as illustrated may further be configured to ignore ones of the fields in state request registers 210 that have the abstain value ("n/a"). For example, circuit blocks 220b and 220c both cast an abstain vote for power domain 240b, in which case performance state 253b, as requested by circuit block 220a, may be selected for power domain 240b. Circuit block 220c cast an abstain vote for power domain 240c, leaving performance management circuit 201 to select between performance states 253c and 252c as requested by circuit blocks 220a and 220b, respectively.

After tallying votes from state request registers 210, performance management circuit 201 may be configured to select a particular one of performance states 251-253 for one or more of power domains 240. As shown, selected performance state 243a is elected for power domain 240a based on fields 215a-215c in state request registers 210. After a selected performance state 243a has been decided for power domains 240a, performance management circuit 201 may be further configured to determine performance state transition path 245a to sequence from a current performance state 252a to the selected performance state 243a.

Performance management circuit 201 may determine transition path 245a based on a variety of considerations. For example, a given power domain may have one or more restrictions for transitioning between performance states. As shown, transition path 245a goes from current performance state 242a (e.g., performance state 251a) to performance state 253a and then to selected performance state 243a (performance state 254a), bypassing performance state 252a. In some cases, there may not be a need to enter performance state 252a on the path to performance state 254a. In other cases, performance state 251a to performance state 252a and/or performance state 252a to performance state 253a may be illegal transitions. Other considerations may include current performance states of the other power domains 240b and 240c. Power domain 240a may not be permitted to be in performance state 252a while power domain 240b is in performance state 253b and/or power domain 240c is in performance state 252c."

As illustrated, performance management circuit 201 is further configured to cause control circuit 230 to transition to selected performance state 243a using performance state transition path 245a. As disclosed above, control circuit 230 may include one or more state machines or other circuits for causing power domains to transition between performance states. A given performance state may include a combination of operating parameters including, for example, voltage levels for one or more power supply signals and frequencies for one or more clock signals. A given performance state may correspond to a particular combination of voltage levels and clock frequencies. Control circuit 230, following transition path 245a, adjusts one or more of these frequencies and/or voltage levels to transition from performance state 251a to performance state 253a and then from performance state 253a to performance state 254a. Part of these state transitions may also include following a particular sequence for changing each clock signal frequency and/or power supply signal voltage level. For example, a particular power supply signal may be transitioned to a higher voltage level before a particular clock signal can be transitioned to a higher frequency. This signal sequencing may further include wait times between individual signal transitions to allow, for example, a power supply signal to settle at a new voltage level or a clock signal to settle at a new frequency.

Use of performance management circuit 201 to manage performance state transitions, may allow system designers to modify respective versions of performance management circuit 201 for different systems based on hardware capabilities of a given system. For example, performance management circuit 201 may include firmware with instructions that cause a processor circuit in performance management circuit 201 to perform one or more of the actions described above. Different implementations of system 200, therefore, may have different firmware based on the capabilities of the given system. Circuit blocks 220 and state request registers 210 may not be modified since they may provide indications of an abstracted performance state. Firmware in performance management circuit 201 may include tables or other techniques for mapping an abstracted performance state indicator to a particular set of operating conditions available within a given system. Accordingly, circuit blocks 220 may not be modified between different embodiments of system 200 to take advantage of hardware capabilities of a given system 200.

It is noted that the example shown in FIG. 2 is one depiction of operation of a performance management circuit utilizing the disclosed techniques. The illustrated numbers of circuit blocks, state request registers, power domains, and performance states are merely for demonstrative purpose and are not intended to be representative of a specific implementation. In other embodiments, any suitable numbers of these elements may be included.

In the description of FIG. 2, operation of a performance management circuit in is disclosed. In this description, control circuit 230 is described as including state machines or other circuitry for managing performance state transitions. Several examples of state machines for use in a performance state control circuit are illustrated in FIG. 3.

Turning to FIG. 3, three state diagrams associated with power domains are shown. State diagrams 300*a*, 300*b*, and 300*c* (collectively 300) depict valid transitions between respective sets of performance states 351-356 (collectively 350, label not shown). In the illustrated examples, performance state 351 may correspond to a lowest performance state and performance state 356 to a highest performance state. Each of state diagrams 300 may, in some embodiments, correspond to a respective one of power domains 140 and/or 240 in FIGS. 1 and 2, respectively. Enforcement of the state transitions may be enforced by control circuit 130/230, performance management circuit 101/201, or combination thereof.

In some embodiments, a performance management circuit (e.g., performance management circuits 101 and/or 201) includes a plurality of state machines corresponding to respective ones of the plurality of power domains. For example, performance management circuit 101 may include a respective state machine corresponding to each of state diagrams 300. In addition, each state diagram 300 may correspond to one of power domains 140. To generate a transition path for power domain 140*b*, performance management circuit 101 may use knowledge of the respective state diagram (e.g., state diagram 300*b*) to determine legal transitions between the various performance states 351*b*-356*b*. This knowledge may be included in firmware used by a processor in performance management circuit 101 and/or may be encoded into combinational logic circuits included in, or accessible to, performance management circuit 101. As an example, performance management circuit 101 may determine a path from performance state 352*b* to 356*b*. As shown in state diagram 300*b*, a shortest transition path may be performance state 352*b* to performance state 353*b* to performance state 356*b*.

To cause control circuit 130 to transition power domain 140*b* to a selected performance state 350, performance management circuit 101 is further configured to use the performance state transition path to sequence a state machine corresponding to state diagram 300*b* through one or more state transitions. As determined above, performance management circuit 101 causes the state machine to follow the transition path from performance state 352*b* to performance state 353*b* to performance state 356*b*. As previously disclosed, a given performance state may include a variety of operational parameters, including for example, voltage levels of one or more power supply signals and frequencies of one or more clock signals. In some embodiments, the state machine may directly set appropriate voltage levels and clock frequencies. In other embodiments, some or all of the voltage levels and clock frequencies may be set by commands issued by performance management circuit 101, e.g., write commands to control registers for a clock circuit or power supply circuit.

Illegal state transitions include transitions not supported by ones of state diagrams 300. For example, state diagram 300*b* does not support transitions between performance state 355*b* and 356*b*. Transitions from performance state 356*b* to 352*b* are allowed, but transitions in the opposite direction are illegal. In addition, an illegal performance state transition may include a restricted combination of performance states 350 across a subset of power domains 140. For example, power domain 140*a* may not be allowed to be in performance state 355*a* while power domain 140*b* is in performance state 351*b* and/or power domain 140*c* is in performance state 354*c*. Accordingly, to determine the performance state transition path, performance management circuit 101 is further configured to determine a transition path that avoids restricted combinations of performance states 350 between power domains 140. In some embodiments, circuitry such as the described state machines may prevent such illegal combinations from being selected. In other embodiments, performance management circuit 101 may be configured to identify all relevant performance states for applicable power domains and determine, for each step in the transition path, whether an illegal combination of performance states would occur. If such an illegal combination is identified, then performance management circuit 101 may alter the determined transition path for one or more power domains.

It is noted that the state diagrams depicted in FIG. 3 are merely examples to demonstrate the disclosed concepts. Although state machines are described for implementing the various state diagrams, use of other types of circuits, and/or software or firmware, is contemplated.

Figure 4:
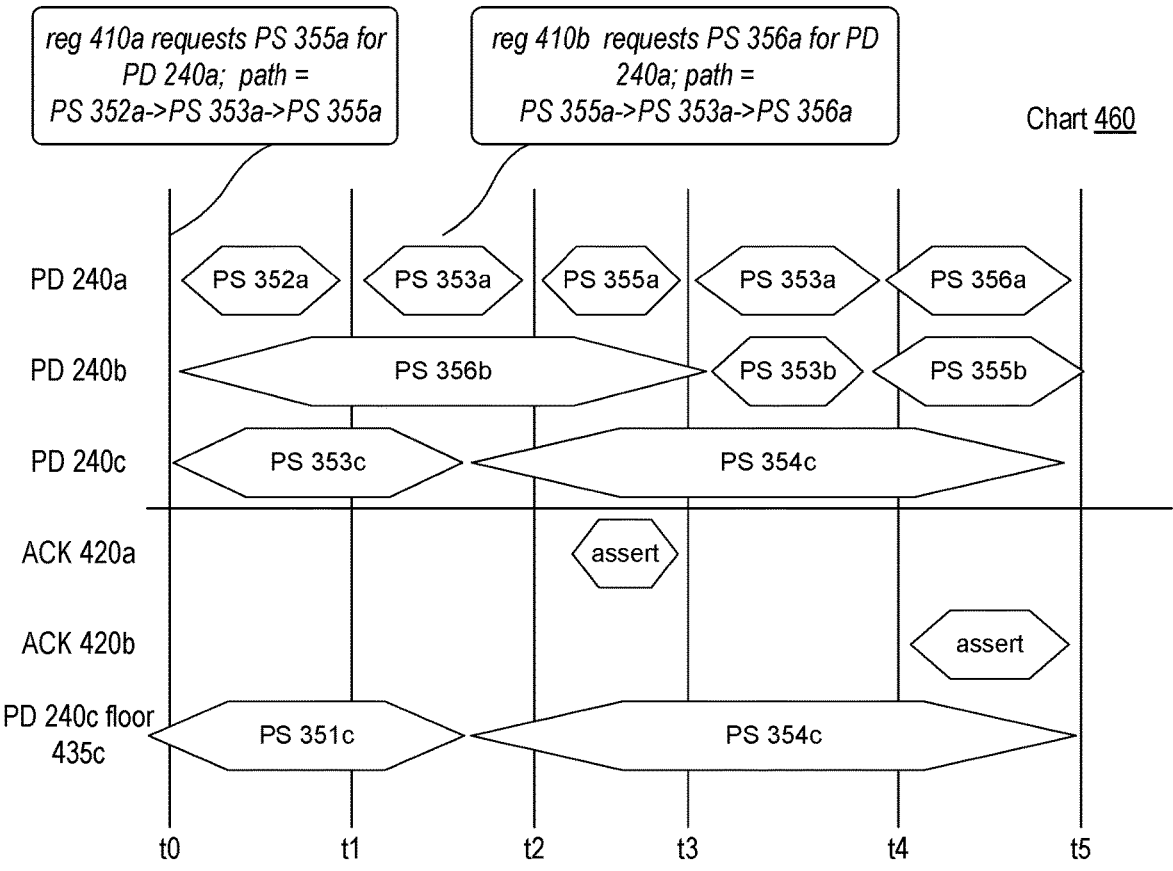
FIG. 4 illustrates a block diagram of an embodiment of a set of state request registers along with a chart depicting state transitions for three power domains.

FIGS. 1-3 describe various circuits for transitioning a plurality of power domains between various performance states. FIG. 4 illustrates an example of how timing of state transitions may be implemented.

Proceeding to FIG. 4, a block diagram of an embodiment of a set of state request registers is illustrated, along with a timing chart depicting when state transitions may occur relative to one another. As shown, system 400 includes state request registers 410, similar to state request registers 210 in FIG. 2. Like registers 210, registers 410 include three fields apiece (respective copies of fields 415-417) for requesting a particular performance state for each of three power domains. In addition, registers 410 include a fourth field (420) for receiving an acknowledgement that a requested performance state has been entered by a respective power domain.

In a similar manner as shown for state request registers 210 in FIG. 2, each of state request registers 210 includes fields associated with respective ones of three power domains, such as power domains 240. For example, register 410*a* includes fields 415*a*, 416*a*, and 417*a* for power domains 240*a*, 240*b*, and 240*c*, respectively. Register 410*a* further includes field 420*a* for an acknowledgement that a particular power domain has entered a performance state that was requested via register 410*a*.

Referring to chart 460, circuit block 220a may, at time to for example, store a value in register 410a that requests performance state 355a for power domain 240a. Performance management circuit 201, at time t1, selects performance state 355a and determines a transition path from a current performance state 352a to the selected performance state 355a, the transition path including performance state 353a. At time t2, power domain 240a enters performance state 355a. In response to power domain 240a entering performance state 355a, performance management circuit 201 is configured to set acknowledgement 420a in register 410a that corresponds to circuit block 220b that requested performance state 355a. Circuit block 220a may be capable of reading acknowledgement 420a in register 410a to confirm the transition to the requested performance state 355a has been completed and circuit block 220a may proceed to perform a given task that utilizes performance state 355a. In some embodiments, the assertion of acknowledgement 420a may cause an exception or other indication to make circuit block 220a aware of the completion of the requested state transition.

Acknowledgement 420a-420c may include a plurality of bits such that an acknowledgement for a particular power domain may be indicated. For example, acknowledgement 420a may include two bits, such that "00" indicates no acknowledgment has been asserted, "01" indicates a transition for power domain 240a has completed, "10" indicates a transition for power domain 240b has completed, and "11" indicates a transition for power domain 240c has completed. In other embodiments, three bits, or three different bit fields may be used, one for each power domain 240, thereby allowing assertions of acknowledgements for multiple power domains concurrently.

In some embodiments, state request register 410a associated with circuit block 220a may be configured to reject a change from a current value to a different value in the associated field until a corresponding acknowledgement 420a has been received by circuit block 220a. For example, if circuit block 220a attempts to change the value of field 415a before acknowledgement 420a is asserted, then register 410a may reject the attempted value change, thereby forcing circuit block 220a to wait for the first state transition to complete before requesting a new transition in a same power domain.

In other embodiments, the new value for field 415a may be accepted prior to the corresponding assertion of acknowledgement 420a. The new value, however, may not be sent to performance management circuit 201 until acknowledgement 420a is asserted. Alternatively, performance management circuit 201 may receive the new value of field 415a, but ignore the new value until acknowledgement 420a is asserted.

Prior to power domain 240a completing the transition to performance state 355a, circuit block 220b may request a different performance state for power domain 240a. As shown between times t1 and t2, circuit block 220b stores a new value into field 415b of register 410b to request performance state 356a for power domain 240a. Performance management circuit 201 is further configured to determine that circuit block 220b has requested performance state 356a for power domain 240a, and delay causing control circuit 230 to transition to performance state 356a until power domain 240a has entered performance state 355a. Performance management circuit 201 allows an initiated state transition to complete before implementing a transition path to the newly requested performance state 356a. Accordingly, in response to the request in register

410b for performance state 356a for power domain 240a, performance management circuit 201 is configured to determine a transition path from performance state 355a to 356a, even though the request was received while power domain 240a was in performance state 353a. At time t4, when power domain 240a transitions into performance state 356a as requested by circuit block 220b, performance management circuit 201 asserts acknowledgment 420b to inform circuit block 220b that the requested transition to performance state 356a has been completed.

As illustrated, performance management circuit 201 is further configured to compare a requested performance state to a current minimum operating state, and in response to a determination that the particular performance state is lower than the current minimum operating state, select the current minimum operating state. For example, performance management circuit 201 may assign a floor performance state to some or all power domains. This floor performance state may be fixed or may be variable, e.g., based on current operating conditions. A floor performance state may help to avoid situations in which a particular power domain is requested to suddenly go from a lowest performance state to a highest performance state. Such a transition may take an undesirable amount of time and therefore may attempt to be avoided.

For example, power domain 240c is assigned a floor value 435c of performance state 351c at some point prior to t0. After the selection of performance state 355a for power domain 240a at time t1, performance management circuit 201 may modify floor value 435c to performance state 354c. This change may be due to the change in power domain 240a to performance state 355a may be indicative of a future request to increase power domain 240c, or may be due to performance state 351c in power domain 240c is an illegal combination with power domain 240a being in performance state 355a, or may be due to other conditions in system 400. As shown, power domain 240c is in performance state 353c based on values of fields 417a-417c in registers 410. The change to floor value 435c may cause performance management circuit 201 to compare the requested performance states in fields 417a-417c of registers 410. Since the requested performance state of 353c is less than the new floor value of performance state 354c, power domain 240c is transitioned into performance state 354c despite none of fields 417a-417c of registers 410 requesting this state. Since the transition to performance state 354c is not requested by any of circuit blocks 220, no acknowledgment signal is asserted.

In some embodiments, in addition to a floor value for performance states, a ceiling value may also be used to limit a given power domain to maximum performance state. Similar to the floor value, in response to a determination that a performance state selected via fields in registers 410 is higher than the current ceiling performance state, performance management circuit is configured to select the current ceiling performance state.

Performance management circuit 201 may also be configured to, in response to a determination that a threshold number of circuit blocks 220 have requested a maximum performance state, delay transition of at least one power domain to the maximum performance state. For example, when circuit block 220b requests performance state 356a for power domain 240a between times t1 and t2, power domain 240b is in performance state 356b. Having circuit blocks 220a and 220b operate with power domains 240a and 240b in performance states 356a and 356b concurrently may exceed such a threshold. Accordingly, performance management circuit 201 may delay transition of power domain 240*a* into performance state 356*a* until power domain 240*b* can be transitioned into a lower performance state. As shown, performance management circuit 201 holds power domain 240*a* in performance state 353*a* until power domain 240*b* can be transitioned from performance state 356*b* into the lower performance state 355*b*. Performance management circuit 201 may then allow the transition of the power domain 240*a* into to the maximum performance state 356*a*.

It is noted that the system and chart of FIG. 4 are merely examples. In other embodiments, a different number of state request registers may be included, and/or each state register may include a different number of performance state request fields and/or acknowledgement fields. The relative timing for state transitions is depicted for clarity, and actual timing during and between state transitions may differ in other embodiments.

In FIGS. 1-4, performance state requests are described as being initiated by circuit blocks. As described above, in some embodiments, one or more processes being executed in a processor circuit may be capable of requesting particular performance states for respective power domains. An example of such an embodiment is shown in FIG. 5.

Figure 5:
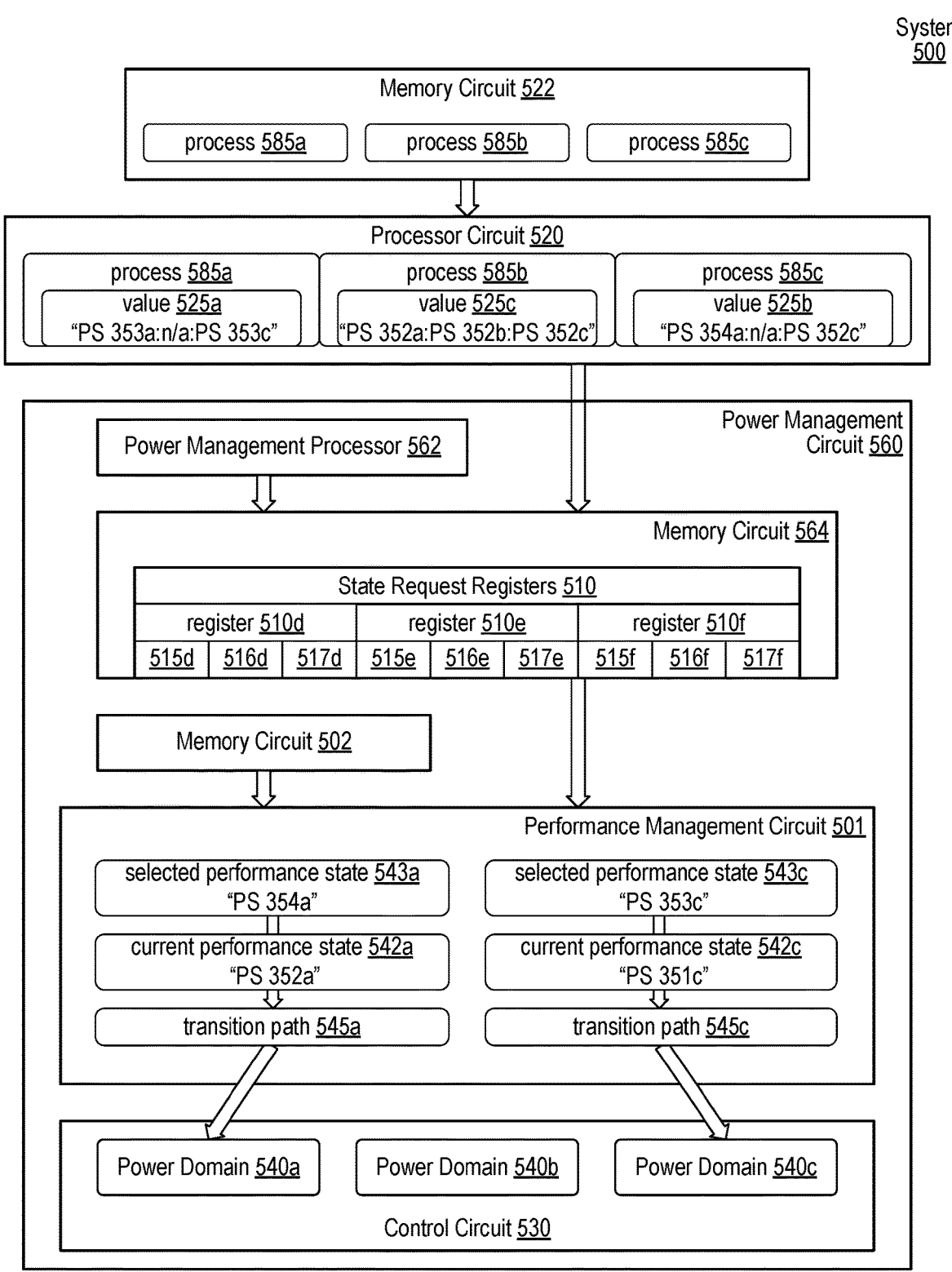
FIG. 5 shows a block diagram of an embodiment of a system that includes a processor circuit capable of storing state values into a set of state request registers in a performance management circuit.

Moving now to FIG. 5, a block diagram of an embodiment of a system that includes a power management circuit is shown. System 500 includes power management circuit 560 that further includes power management processor 562, memory circuit 564 performance management circuit 501, memory circuit 502, and control circuit 530. System 500 also includes processor circuit 520 and memory circuit 522. In a manner similar to systems 100 and 200, system 500 may be implemented using one or more integrated circuits, and may be included in a computing system, such as a desktop or laptop computer, a smartphone, a tablet computer, a wearable smart device, or the like.

As illustrated, memory circuit 522 stores instructions corresponding to processes 585*a*-585*c* (collectively 585). In various embodiments, memory circuit 522 may include non-volatile memory circuits (e.g., flash memory, hard-drive circuits, and the like), volatile memory circuits (e.g., static random-access memory (SRAM), dynamic random-access memory (DRAM), register circuits), or a combination thereof. Processor circuit 520 is configured to execute processes 585. For example, processor circuit 520 may be a processor core complex that includes a plurality of cores, each core capable of executing one or more of processes 585. One or more of processes 585 may be configured to generate respective state values 525*a*-525*c* (collectively 525) to indicate requested ones of a set of performance states (e.g., performance states 350 in FIG. 3). As shown, a given state value 525 includes a plurality of fields associated with respective ones of power domains 540. Processor circuit 520 may be configured to store, by executing processes 585, respective state values 525 into state request registers 510. In some embodiments, power management processor 562 may monitor operations of one or more of processes 585, and determine appropriate performance states for these one or more processes 585.

As illustrated, state request registers 510 are implemented in memory circuit 564 in power management circuit 560. Memory circuit 564 may be implemented as SRAM, DRAM, register circuits, or combinations thereof. In other embodiments, state request registers 510 may be implemented in memory circuit 502 coupled to performance management circuit 501. As shown, each of state request registers 510 includes three fields, 515-517, further labeled "d," "e," or "f" to correspond with registers 510*d*, 510*e*, and

510*f*, respectively. In a similar manner as described above for fields 215-217, fields 515-517 each correspond to one of power domains 540, and allow processes 585 to vote for a particular one of performance states 350 for each of power domains 540.

As shown, performance management circuit 501 is configured to read the respective state values 525 from registers 510. For a particular one of power domains 540, performance management circuit 501 may select a particular one of performance states 350 as indicated in the associated fields of state values 525. To select a performance state for power domain 540*a*, for example, performance management circuit 501 may read portions of values 525 that have been stored into the respective fields 515 of registers 510. As shown, performance state 354*a* is determined to be selected performance state 543*a*. Performance management circuit 501 further determines that current performance state 542*a* for power domain 540*a* is performance state 352*a*. Performance management circuit 501 determines transition path 545*a* to sequence power domain 540*a* from current performance state 542 to selected performance state 543*a*. As described above, if performance management circuit 501 determines that transition path 545*a* results in an illegal state, then transition path 545*a* may be modified to avoid the illegal state.

Performance management circuit 501, as illustrated, is further configured to determine transition path 545*c* for power domain 540*c* using fields 517 from state request registers 510. In this example, performance state 353*c* is determined as the selected performance state 543*c* and performance state 351*c* is determined to be the current performance state 542*c* for power domain 540*c*. In some embodiments, performance management circuit 501 is further configured to identify, across transition paths 545*a* and 545*c*, restricted combinations of performance states of power domains 540*a* and 540*c*. For example, power domain 540*a* may be restricted from a high-performance state if power domain 540*c* is in a low-performance state. If a conflict is identified, then performance management circuit 501 may be further configured to modify transition path 545*a* and/or 545*c* to avoid the restricted combinations.

Control circuit 530 is similar to control circuit 130 and 230 in FIGS. 1 and 2, respectively. In a like manner as described above, control circuit 530 may be configured to transition one or more of power domains 540 into respective ones of performance states 350. Although shown as a part of power management circuit 560, control circuit 530, may, in other embodiments, be included in a different element of system 500. After transition path 545*a* and/or transition path 545*c* are determined, and revised if needed, then performance management circuit 501 may cause control circuit 530 to transition power domain 540*a* and/or 540*c* to the selected performance states 543*a* and 543*c*.

In some embodiments, system 500 may include an evaluation/debug mode used by evaluators to analyze performance of system 500. Performance state information may, in some cases, be valuable information to these evaluators. Accordingly, performance management circuit may be further configured to, in response to a determination that an evaluation mode is enabled, track one or more parameters associated with performance state transitions, and provide these one or more parameters to the power management processor 562. As disclosed above, the separation of hardware circuit details from software, such as processes 585, may increase portability of software across different system designs. Due to this separation of details, power management processor 562, during normal operation, may not have access to knowledge regarding which specific operating conditions apply to given ones of the performance states 350. In the evaluation mode, however, performance management circuit 501 may be configured to send these details to power management processor 562, which may then have a capability to pass the information to a hardware/software evaluation interface that allows the evaluator to see particular operating conditions for a selected performance state for ones of power domains 540. Evaluators may be able to use this information to identify system bugs and/or design improvements in how power domains 540 are managed.

It is noted that the system depicted in FIG. 5 is merely an example for describing the disclosed techniques. Although three power domains are depicted, any suitable number of power domains may be included in other embodiments.

The systems illustrated in FIGS. 1-5 are described for use in determining performance states for power domains. It is contemplated that the use of request registers to abstract software requests from hardware capabilities may be applicable to other elements of computer systems. FIG. 5 illustrates one such alternative use.

Figure 6:
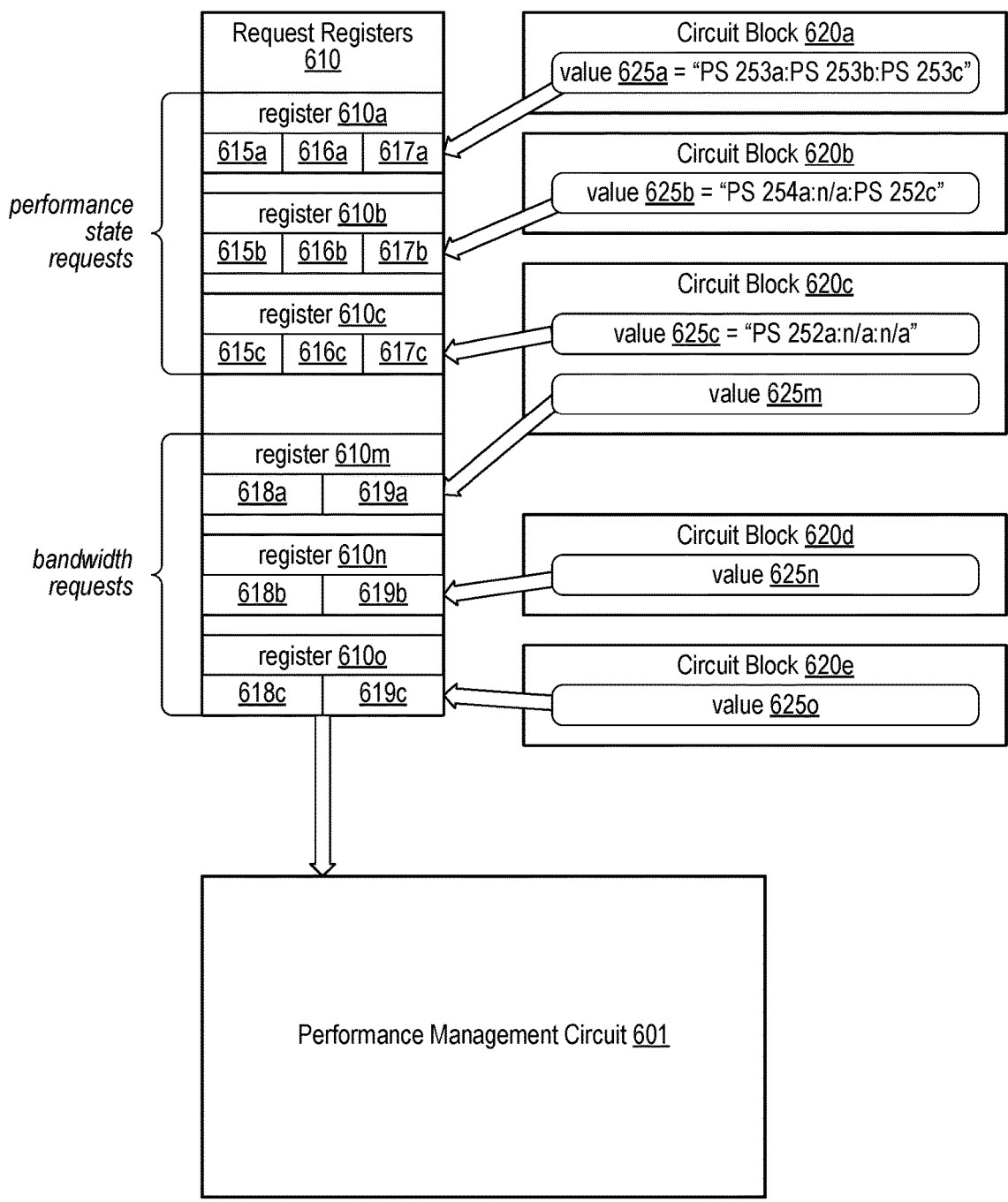
FIG. 6 illustrates a block diagram of an embodiment of a system that includes a set of request registers for storing performance state requests and bandwidth requests.

Proceeding now to FIG. 6, a block diagram of an embodiment of a system that includes request registers is shown. As illustrated, system 600 includes performance management circuit 601, request registers 610, and circuit blocks 620a-620e (collectively 620). Request registers 610 include three performance state request registers (registers 610a-610c) and three bandwidth request registers (registers 610m-610o).

As shown, performance management circuit 601 is configured to use registers 610a-610c to select performance states for respective power domains and determine transition paths for the power domains from current performance states to the selected states, using any suitable technique as described above.

In addition to managing performance states for power domains, performance management circuit 601 may be further configured to manage bandwidth requests from one or more of circuit blocks 620. These bandwidth requests may be related to, for example, memory transactions performed across one or more communication networks in system 600. Performance management circuit 601 may use bandwidth requests determine a global bandwidth need across system 600 and determine allocations to various ones of the requesting circuit blocks 620. Performance management circuit 601 may further use the bandwidth requests to select one or more power states for power domains that support at least a portion of the communication networks.

Performance management circuit 601, as illustrated, may be further configured to monitor the operation of one or more of circuit blocks 620. For example, performance management circuit 601 may be further configured to receive a respective bandwidth request from a different subset of circuit blocks 620. For example, circuit blocks 620a-620c store values 625a-625c into respective ones of registers 610a-610c, thereby placing requests for particular performance states for respective power domains as has been described. In addition, circuit blocks 620c-620e store values 625m-625o into respective ones of registers 610m-610o, thereby placing respective requests for a particular level of bandwidth over the one or more communication networks. A given bandwidth request is independent of a given performance state. As shown, circuit block 620c places requests for both a particular performance state for one of the power domains as well as a particular bandwidth requests. Accordingly, performance management circuit 601 may be capable of receiving independent requests for performance states and bandwidth using a similar set of registers.

Performance management circuit 601 may process the requests independently, or in some cases, may use one request to weight another. For example, if circuit block 620c is requesting a high-performance state and a large level of network bandwidth, then performance management may place a high priority on selecting the high-performance state. In other cases, performance management circuit 601 may determine that the requested bandwidth is unavailable at the current time due to a total global bandwidth being requested, and in response, may lower a priority for the requested performance state since circuit block 620c may not need the requested performance state with the limited bandwidth availability.

The example of FIG. 6 is one example of using request registers to select a variety of operating parameters of a computer system. Although bandwidth is used in the example, other operating parameters may be used instead, or in addition. For example, request registers may be used to request access to other circuit blocks, such as encryption, audio, graphics, neural engines, and the like.

The performance states described in regards to the preceding figures are described as including combinations of clock signals and power supply signals. Frequencies and voltage levels may be associated with performance states in a variety of manners. FIG. 7 depicts how clock and power supply signals may be managed in relation to performance states.

Moving to FIG. 7, a block diagram of an embodiment of a system with a clock source and a voltage regulator is illustrated, along with a timing chart depicting when transitions to clock frequencies and power supply signal voltage levels may occur relative to one another. As shown, system 700 includes clock source 710, capable of generating clock signals 715a-715c (collectively 715). System 700 further includes voltage regulator 720, capable of generating power supply (PS) signals 725a-725c (collectively 725). Chart 760 depicts frequencies 716-719 for each of clock signals 715 and voltage levels 726-729 for each of PS signals 725 over time.

As illustrated, the previously describe performance states (e.g., performance states 151-154 of FIG. 1) include respective combinations of a frequency of one or more of clock signals 715 and a voltage level of one or more of PS signals 725. Firmware in system 700, e.g., firmware 106, may include one or more tables that map a given performance state to one or more operating parameters, including a frequency of at least one of clock signal 715 and a voltage level of at least one of PS signals 725.

To perform a sequencing based on, e.g., transition path 145, performance management circuit 101 may be further configured to avoid restricted performance states that include an illegal combination of clock signal 715 frequency and PS signal 725 voltage in a given power domain. At time t1, for example, performance management circuit 101 may receive a request to transition power domain 140c from performance state 152c to 153c. To cause control circuit 130 to transition power domain 140c from performance state 152 to 153c, performance management circuit 101 may cause, at time t2, a transition of clock signal 715c, associated with the power domain 140c, from frequency 718 to frequency 717. In response to a determination the transition of clock signal 715c has completed at time t4, performance management circuit 101 may cause a transition of a PS signal 725c, also associated with power domain 140c, from voltage level 727 to voltage level 726. It is noted that there is a delay depicted between the change to frequency 717 to time t4. This delay may include settling time for clock signal 715c and/or time for circuits using clock signal 715c to adjust to the new frequency.

For power domain 140c, the combination of frequency 718 on clock signal 715c and voltage level 727 on PS signal 725c may correspond to the initial performance state 152. When clock signal 715c is set to frequency 717, the combination with voltage level 727 on PS signal 725c may correspond to performance state 151c. Likewise, the final combination of frequency 717 on clock signal 715c and voltage level 726 on PS signal 725c may correspond to the selected performance state 153.

In another example, performance management circuit 101 may receive, also at time t1, a request to transition power domain 140c from performance state 151b to 153b. To avoid a restricted performance state in power domain 140b, performance management circuit 101 may adjust, at time t2, clock signal 715b in power domain 140b from frequency 718 to frequency 716. In response to the adjustment of clock signal 715b to frequency 716, performance management circuit 101 may adjust, at time t3, power signal 725b in power domain 140b to voltage level 726, followed by adjusting, at time t4, power signal 725b to voltage level 729. This two-step adjustment may be performed to avoid an illegal performance state, ether within power domain 140b, or in combination with performance states of other power domains 140. In response to the adjustment of power signal 725b to voltage level 729, performance management circuit 101 may readjust, at time t5, clock signal 715b in power domain 140b to frequency 718.

It is noted that performance management circuit 101 may be further configured to select a particular voltage level for a power supply signal in a given one of the one or more power domains without informing the power management processor of the selected voltage level. Similarly, performance management circuit 101 may be further configured to select a particular frequency for a clock signal in a given power domain without informing the power management processor of the selected frequency. As previously disclosed, separation of hardware specifics from operation of one or more software processes may be desired for software portability, as well as flexibility in hardware design without making concessions for software. Also, as previously disclosed, in an evaluation mode, performance management circuit 101 may inform the power management processor of changes to selected voltage levels and/or frequencies.

It is further noted that the system and chart of FIG. 7 are merely examples. In other embodiments, a different number of clock signals and/or power supply signals may be included. The relative timing for voltage and frequency transitions is depicted for clarity, and actual timing during and between transitions may differ in other embodiments. Although a voltage regulator is illustrated as generating the three power supply signals, it is contemplated that any suitable voltage regulating circuits may be used.

To summarize, various embodiments of a system may include a power management processor that may be configured to monitor operation of one or more circuit blocks in the system, and to determine a particular performance state of a set of performance states for one or more power domains in the system based on the monitored operation. The system further includes a performance management circuit that may be configured to receive, from the power management processor, an indication of the particular performance state. The performance management circuit may further be configured to determine a transition path from a current performance state to the particular performance state that avoids illegal performance state transitions, and to cause a control circuit to transition to the particular performance state using the transition path.

In a further example, an illegal performance state transition may include a restricted combination of performance states for a subset of the one or more power domains. In an example, to monitor the operation of the one or more circuit blocks, the performance management circuit may be further configured to receive a respective performance state request from a subset of the one or more circuit blocks, wherein a given performance state request indicates a desired performance state.

In another example, to monitor the operation of the one or more circuit blocks the performance management circuit may be further configured to receive a respective bandwidth request from a different subset of the one or more circuit blocks, wherein a given bandwidth request is independent of a given performance state. In an example, to cause the control circuit to transition to the particular performance state, the performance management circuit may be further configured to select a particular voltage level for a power supply signal in a given one of the one or more power domains without informing the power management processor of the selected voltage level.

In an example embodiment, an apparatus includes a control circuit configured to transition a plurality of power domains into selected ones of a set of performance states, and a set of state request registers. A given state request register may include fields that are associated with respective ones of the plurality of power domains. The apparatus may further include a plurality of circuit blocks configured to store respective state request values into respective ones of the set of state request registers. A given state request value may indicate a given requested performance state for at least one of the plurality of power domains. In addition, the apparatus may include a performance management circuit that is configured to select, using the associated fields in the set of state request registers, a particular performance state of the requested performance states for at least one of the plurality of power domains. The performance management circuit may be further configured to determine a performance state transition path to sequence from a current performance state to the selected performance state, and to cause the control circuit to transition to the selected performance state using the performance state transition path.

In a further example, to store a respective state request value into a respective state request register, a particular circuit block of the plurality of circuit blocks may be configured to store a particular value in a first field of the respective state request register, the first field associated with a first power domain of the plurality of power domains. The particular value may indicate a vote for a first performance state of the set of performance states for the first power domain. The particular circuit block may also be configured to store an abstain value in a second field of the respective state request register, the second field associated with a second power domain of the plurality of power domains. The abstain value may indicate no performance state preference for the second power domain.

In an embodiment, to select a particular one of the requested performance states for the second power domain, the performance management circuit may be further configured to ignore ones of the second field in the set of state request registers that have the abstain value. In another embodiment, the performance management circuit may include a plurality of state machines corresponding to respective ones of the plurality of power domains. To cause the control circuit to transition a particular one of the power domains to the selected performance state, the performance management circuit may be further configured to use the performance state transition path to sequence a corresponding one of the plurality of state machines through one or more state transitions.

In one example, the performance management circuit may be further configured to, in response to a particular power domain entering the particular performance state, set a particular acknowledgement signal that corresponds to a requesting circuit block that requested the particular performance state for the particular power domain. In a further example, a state request register associated with the requesting circuit block may be configured to reject a change from a current value to a different value in the associated field until a corresponding acknowledgement has been received by the requesting circuit block.

The circuits and techniques described above in regards to FIGS. 1-7 may be performed using a variety of methods. Methods associated with operation of a performance management circuit are described below in regards to FIGS. 8 through 12.

Turning now to FIG. 8, a flow diagram for an embodiment of a method for managing performance states of a plurality of power domains is illustrated. Method 800 may be used in conjunction with any of the computer circuitry, systems, devices, elements, or components disclosed herein, such as systems 100 to 700 in FIGS. 1-7. In some embodiments, some or all of the operations of method 800 may be performed using instructions included in a non-transitory, computer-readable storage medium having program instructions that are executable by a processing circuit in the disclosed systems to cause the operations described with reference to FIG. 8. Method 800 is described below using system 100 of FIG. 1 as an example. References to elements in FIG. 1 are included as non-limiting examples.

As illustrated, method 800 begins in block 810 with a first processor circuit in an integrated circuit (IC) executing a control loop to monitor performance of a plurality of circuit blocks in the IC. For example, processor 112 of power management processor 110 may, by executing one or more of control loops 116, monitor the performance of circuit blocks 120 as shown in FIG. 1. This monitoring may include receiving requested state values from one or more of circuit blocks 120. In some embodiments, circuit blocks 120 may send commands or requests to processor 112. In other embodiments, circuit blocks 120 may store state value requests into particular locations of a memory circuit that is accessible by processor 112. Processor 112 may, in response to a change in value to one or more of the particular locations, determine whether a new performance state should be selected. In some embodiments, state value requests may be abstracted from specific hardware operating parameters. Instead, a relative performance level, e.g., a value from zero to four, or any suitable range of values, may be indicated. Such an abstraction may allow software executing in system 100 to be written for a range of hardware systems that may have different performance capabilities.

The monitoring may also include receiving a bandwidth request from one of circuit blocks 120. This bandwidth request may be indicative of a number of transactions to be transferred from the one of circuit blocks 120. As described above, a given bandwidth request may be independent of a given performance state.

Method 800 continues at block 820 with the first processor circuit executing the control loop to determine requested performance states for a plurality of power domains included in the IC. Processor 112 executing one or more of control loops 116, for example, may determine a respective performance state 150 for one or more of power domains 140. Determining the requested performance states may include, for example, using the requested state values received from the one or more of circuit blocks 120. A given requested state value may indicate a respective requested performance state 150 for one or more of power domains 140. Processor 112 may select a particular performance state 150 by determining, using the received requested state values, a highest requested performance state 150 for each of power domains 140. As an example, circuit block 120a may vote for performance state 152 for power domain 140a and performance state 153 for power domain 140b, while circuit block 120b may vote for performance state 152 for power domain 140b and performance state 154 for power domain 140c. If no other requested state values are received in a particular voting period, then performance state 152 may be selected for power domain 140a, performance state 153 may be selected for power domain 140b, and performance state 154 may be selected for power domain 140c, as these performance states may represent the highest requested performance states for each power domain.

At block 830, method 800 continues with a second processor circuit in the IC executing firmware that is specific to a given instance of the IC. As stated above, circuit blocks 120 and power management processor 110 may utilize an abstracted value for requested state values. In such embodiments, software may not need to be aware of particular hardware capabilities of system 100. Processor 102 in performance management circuit 101 may, instead, have access to information that is specific to system 100. For example, firmware 106 may include tables that associate a requested state value to a particular set of operating parameters. These sets of operating parameters may be defined for the particular requested performance state 150 specific to the given instance of the IC. Processor 112 in power management processor 110 may not have access to the sets of operating parameters. Processor 102, executing firmware 106, may select a set of operating parameters associated with a particular one of the requested performance states 150. In some embodiments, operating parameters may include a voltage level for a power signal and a frequency for a clock signal.

Method 800 further continues at block 840 with the second processor circuit, using the requested performance states, controlling sequencing of performance states among the plurality of power domains within the IC. This sequencing may avoid illegal performance state transitions. An illegal performance state transition may include a restricted combination of performance states among a subset of the plurality of power domains. For example, power domain 140b may not be allowed in performance state 153 or 154 while power domains 140a and 140c are in performance state 151. Accordingly, if performance state 153 or 154 is selected for power domain 140b while either of power domains 140a and 140c are in performance state 151, then processor 102 in performance management circuit 101 may either prevent power domain 140b from entering either of the restricted performance states, or may transition power domains 140a and/or 140c out of performance state 151 and into a performance state that is compatible with the selected performance state for power domain 140b.

By using abstract performance states on a software side of a system and bridging the abstracted performance states to specific hardware parameters in a performance management circuit, specific hardware details may be omitted from software design, allowing for more portable code to be written for a wider range of hardware designs. Firmware for a performance management circuit may be written for specific hardware platforms to map the abstract indications of performance states to particular sets of operational parameters that are suitable for the specific hardware platform.

It is noted that the method of FIG. 8 includes blocks 810-840. Method 800 may end in block 840 or may repeat some or all blocks of the method. For example, method 800 may return to block 820 to receive additional performance states from the monitored circuit blocks. In some cases, blocks of method 800, or a portion thereof, may be performed concurrently with other blocks of the method. For example, blocks 810 and 820 may be performed by a power management processor while blocks 830 and 840 are being performed by a performance management circuit.

Figure 9:
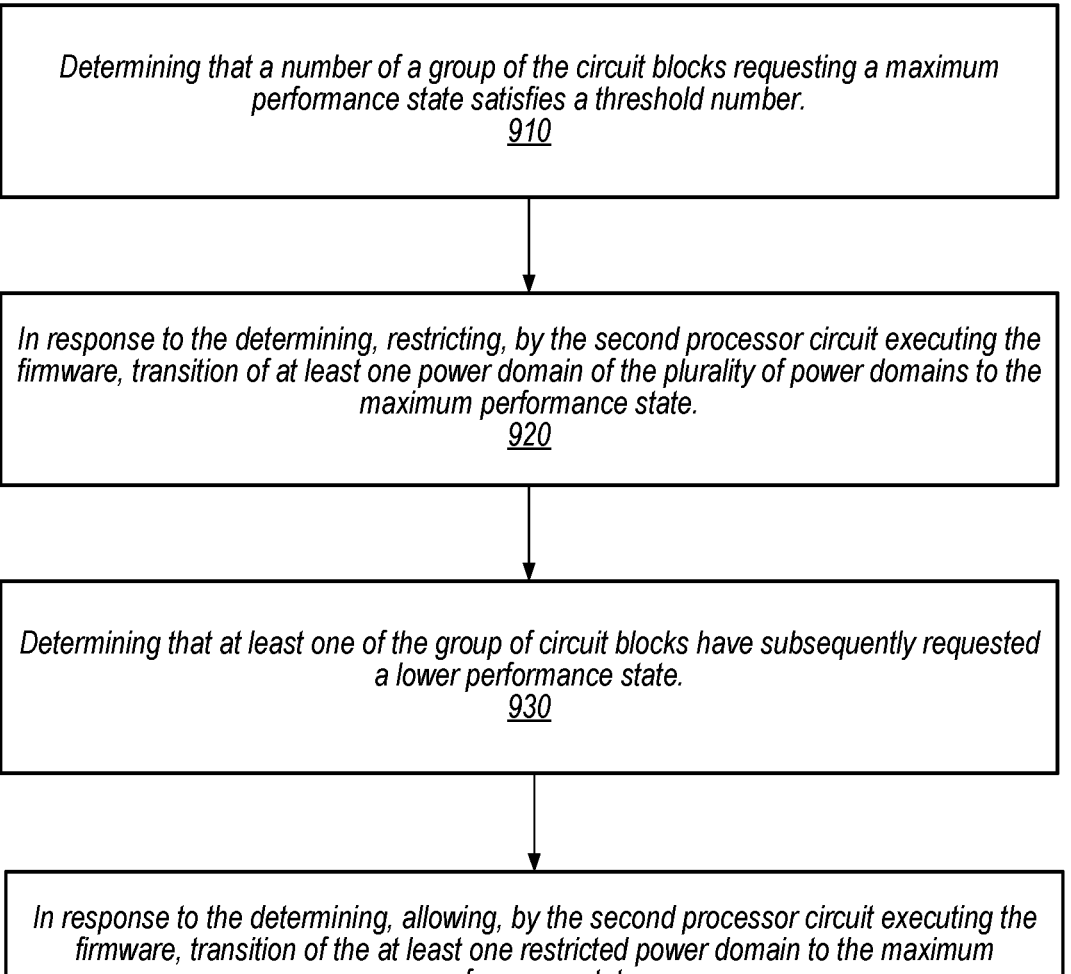
FIG. 9 depicts a flow diagram of an embodiment of a method for avoiding a restricted performance state transition by a performance management circuit.

Proceeding now to FIG. 9, a flow diagram for an embodiment of a method for avoiding illegal performance states by a performance management circuit is illustrated. Similar to method 800, method 900 may be used in conjunction with any of the computer circuitry, systems, devices, elements, or components disclosed herein, including any of systems 100-700. Some or all of the operations of method 900, in some embodiments, may be performed using instructions included in a non-transitory, computer-readable storage medium having program instructions, the instructions being executable by a processing circuit in a given system to cause the operations described with reference to FIG. 9. Method 900 is described below using FIG. 1 as an example embodiment. References to elements of FIG. 1 are included as non-limiting examples. Some or all of method 900, in some embodiments, may be performed as a part of block 840 of method 800.

As shown, method 900 begins in block 910 with the second processor circuit, executing the firmware, determining that a number of a group of the circuit blocks requesting a maximum performance state satisfies a threshold number. For example, system 100 may have limited capability for supplying power via one or more power supply signals. Such a limitation may be a result of designing system 100 to be smaller and/or more power efficient than other similar systems. Due to the limited power capabilities, system 100 may not support all three power domains operating in performance state 154 concurrently. Accordingly, processor 102 in performance management circuit 101 may determine, after requested state values have been received, whether circuit blocks 120 are requesting performance state 154 for the threshold number of power domains 140.

At block 920, method 900 continues with the second processor circuit, in response to the determining, restricting transition of at least one power domain of the plurality of power domains to the maximum performance state. For example, processor 102 may determine that circuit blocks 120 have requested that all three power domains 140 transition to performance state 154. In response, at least one of power domains may be prevented from entering performance state 154. Any suitable technique for selecting one or more of power domains from entering performance state 154 may be used. For example, priorities may be assigned to each of power domains 140, a least-recently-used algorithm may be employed, circuit blocks 120 may use a power credit system for requesting state changes, or combinations thereof may be utilized. In the present example, power domain 140a is restricted from entering performance state 154 while power domains 140b and 140c are allowed to transition. In some embodiments, power domain 140a may be placed into a performance state in which all operating parameters are the same as performance state 154 except one or more clock signals may be restricted to a lower frequency to conserve power.

Method 900 further proceeds at block 930 with the second processor circuit determining that at least one of the group of circuit blocks have subsequently requested a lower performance state. At a subsequent point in time after transitioning into performance state 154, one or more of circuit blocks 120 may request, for at least one of power domains 140, a different performance state that is lower in performance than performance state 154, e.g., circuit block 120c may request performance state 152 for power domain 140c after completing a particular task that was associated with performance state 154 in power domain 140c.

At block 940, method 900 continues with the second processor circuit, in response to determining that the at least one circuit block has requested a lower performance state, allowing transition of the at least one restricted power domain to the maximum performance state. For example, after power domain 140c has transitioned into performance state 152, power domain 140a may be permitted to enter performance state 154. If, for example, power domain 140a was restricted from performance state 154 by use of a lower clock signal frequency, then this clock signal frequency may be increased to a frequency associated with performance state 154.

By restricting a number of circuits that may operate concurrently in a maximum performance state, a given system may be designed for smaller size and/or reduced power consumption. For example, designing a system in which all circuits are allowed to operate at maximum performance may result in power supply circuits and power signal routing being designed for worst-case conditions that may rarely, if ever, be used in the system. Such designs may be larger and/or more complex than designs that do not have to support such worst-case scenarios.

It is noted that method 900 includes blocks 910-940. Method 900 may end in block 940 or may repeat some or all blocks of the method. For example, blocks 910 and 920 may be repeated until a lower performance state is requested for at least one of the power domains. In addition, blocks 930 and 940 may be repeated to permit a plurality of restricted power domains to individually be transitioned into higher performance states.

Moving to FIG. 10, a flow diagram for an embodiment of a method for a performance management circuit to use a plurality of state request registers to manage state change requests of a plurality of power domains is illustrated. Similar to methods 800 and 900, method 1000 may be used in conjunction with any of the computer circuitry, systems, devices, elements, or components disclosed herein, including any of systems 100-700. Operations of method 1000 may, in whole or in part, be performed using instructions included in a non-transitory, computer-readable storage medium having program instructions being executable by a processing circuit in a given system to cause the operations described with reference to FIG. 10. Method 1000 is described below using FIG. 2 as an example embodiment. References to elements of FIG. 2 are included as non-limiting examples.

As illustrated, method 1000 begins in block 1010 with a first circuit block in an integrated circuit (IC) storing a first requested state value into a first memory location. For example, circuit block 220a, as shown in FIG. 2, stores value 225a into register 210a of registers 210. Value 225a includes a plurality of fields corresponding to respective ones of power domains 240 included in system 200. Register 210*a* includes fields 215*a*, 216*a*, and 217*a* for storing each of the fields in value 225*a*. In some embodiments, field 215*a* may correspond to power domain 240*a*, field 216*a* to power domain 240*b*, and field 217*a* to power domain 240*c*.

Method 1000 continues in block 1020 with a second circuit block in the IC storing a second requested state value into a second memory location. For example, circuit block 220*b* stores value 225*b* into register 210*b*. Register 210*b* includes a respective set of the same fields as register 210*a*, for storing a plurality of fields of value 225*b* corresponding to the respective ones of power domains 240. Values 225*a* and 225*b* may represent votes by circuit blocks 220*a* and 220*b* for requesting particular performance states for the respective power domains 240. Circuit blocks 220*a* and 220*b* may store their respective values 225*a* and 225*b* independently. Circuit block 220*c* may further store value 225*c* into register 210*c*.

At block 1030, method 1000 continues with a performance management circuit in the IC determining a first performance state for a first power domain of the plurality of power domains. As shown in FIG. 2, performance management circuit 201 may retrieve values 225 from registers 210. Using field 215 of registers 210, performance management circuit 201 may determine a requested performance state for power domain 240*a*. For example, determining the performance state for power domain 240*a* may include identifying a highest requested state value from the fields 215 of registers 210. As shown, values 225*a*, 225*b*, and 225*c* indicate performance states 253*a*, 254*a*, and 252*a*, respectively. Performance state 254*a* may correspond to the highest performance state and, therefore, be chosen by performance management circuit 201 as the selected performance state.

Method 1000 proceeds at block 1040 with the performance management circuit determining a second performance state for a second power domain of the plurality of power domains. To select a performance state for power domain 240*b*, performance management circuit 201 may use fields 216 of registers 210. As described for block 1030, a highest indicated performance state may be selected. As shown in FIG. 2, fields 216*b* and 216*c* may be set to an abstain vote, leaving field 216*a* as a lone vote for selecting performance state 253*b* for power domain 240*b*. Performance management circuit 201 may further select a performance state for power domain 240*c* by similarly using fields 217 of registers 210.

At block 1050, method 1000 continues with the performance management circuit causing the first and second power domains to transition to the respective first and second performance states. For example, performance management circuit 201 may determine a current performance state for each of power domains 240 as well as the selected performance state for each. Performance management circuit 201 may then determine a transition path for sequencing each power domain from the respective current to the respective selected performance state. Performance management circuit 201 may include, or have access to, information regarding restricted combinations of performance states. Using this information, performance management circuit 201 may, after determining the transition paths, further determine if any restricted combinations of performance states would be entered based on the transition paths. If so, then one or more of the transition paths may be altered to avoid restricted combinations.

Use of state request registers may allow for a plurality of circuit blocks to vote for a desired performance state for a plurality of power domains. A performance management circuit may then tally votes and select an appropriate performance state for one or more of the power domains. The state request registers may enable software, and/or hardware circuits in a system to request performance states using abstract indicators for the different performance states. These abstract indicators may not include specific operating parameters for the power domains. Accordingly, the performance management circuit may map particular performance state indicators to specific sets of operating parameters, thereby allowing such mapping information to be maintained in a single location in the performance management circuit.

Turning to FIG. 11, a flow diagram for an embodiment of a method for a performance management circuit to avoid restricted conditions is shown. Similar to the previously disclosed methods, method 1100 may be used in conjunction with any of the computer circuitry, systems, devices, elements, or components disclosed herein, including any of systems 100-700. In some embodiments, operations of method 1100 may be performed using instructions stored in a non-transitory, computer-readable storage medium having program instructions that are executable by a processing circuit in a given system to cause the operations described with reference to FIG. 11. Method 1100 is described below using FIG. 2 as an example embodiment. References to elements of FIG. 2 are included as non-limiting examples. Some or all of method 1100, in some embodiments, may be performed as a part of block 1050 of method 1000. Accordingly, method 1100 begins after the performance management circuit has first and second performance states for first and second power domains.

As illustrated, method 1100 begins at block 1110 with the performance management circuit determining that placing the second power domain into the determined second performance state would result in a restricted condition. For example, performance management circuit 201 may determine that a number of circuit blocks in system 200 operating in the second performance state in power domain 240*b* exceeds a threshold number of circuit blocks allowed to concurrently operate at the second performance state. As described above, a power supply circuit that generates one or more power signals for power domain 240*b* may not be designed to handle a worst-case condition, such as all of circuit blocks 220 being in a highest performance state at a same time. Such a condition may, for example, draw more current than the power supply circuit can provide and/or more current than power rails to circuit blocks 220 can carry.

At block 1120, method 1100 continues with the performance management circuit, in response to determining the restricted condition, placing the second power domain into a reduced second performance state. For example, if performance state 254*b* is selected for power domain 240*b*, then performance management circuit 201 may place power domain 240*b* into performance state 253*b* instead. In some embodiments, the lower performance state 253*b* may include a reduced frequency of one or more clock signals as compared to performance state 254*b*. Performance state 253*b* may allow the threshold number of circuit blocks 220 to operate concurrently without a risk of improper operation. In some embodiments, a power management processor and/or circuit blocks 220 may not be informed of the use of performance state 253*b*, thereby maintaining a separation of hardware and software elements of the performance management.

Method 1100 continues at block 1130 with the performance management circuit, in response to a determination that the number of circuit blocks in the IC operating in the second performance state in the second power domain is below the threshold number, placing the second power domain into an unrestricted second power state. At a subsequent point in time, a number of circuit blocks 220 that are requesting performance state 254*b* for power domain 240*b* has fallen below the threshold number. For example, one or more of circuit blocks 220 may store new values into their respective state request registers 210, indicating requests for lower performance states than 254*b* for power domain 240*b*. Accordingly, power domain 240*b* may be raised into performance state 254*b* providing at least one of circuit blocks 220 is still requesting this performance state.

It is noted that method 1100 includes blocks 1110-1130. Method 1100 may end in block 1130 or may repeat some or all blocks of the method. For example, blocks 1110 and 1120 may be repeated until a lower performance state is requested by at least one of the circuit blocks. In addition, block 1130 may be repeated to permit a plurality of restricted power domains to individually be transitioned into higher performance states.

Proceeding to FIG. 12, a flow diagram for an embodiment of a method for a performance management circuit to avoid restricted conditions is shown. Method 1200 may, in a manner as previously described, be used in conjunction with any of the computer circuitry, systems, devices, elements, or components disclosed herein, including any of systems 100-700. Operations of method 1200 may be performed using instructions stored in a non-transitory, computer-readable storage medium having program instructions that are executable by a processing circuit in a given system to cause the operations described with reference to FIG. 12. Method 1200 is described below using FIG. 2 as a non-limiting example. Some or all of method 1200, in some embodiments, may be performed as a part of, or subsequent to, block 1050 of method 1000. Accordingly, method 1200 begins after the performance management circuit has caused the first power domain to begin to transition to a new performance state.

As illustrated, method 1200 begins at block 1210 with the performance management circuit, in response to determining that the first power domain has entered a performance state indicated by the first field of the first requested state value, sending a first acknowledgement signal to the first circuit block. For example, power domain 240*a* may be transitioning from performance state 251*a* to 254*a*, using a transition path that places power domain 240*a* into performance state 253*a* during the transitioning. In response to power domain 240*a* entering performance state 253*a*, performance management circuit 201 may assert a first acknowledgement signal that corresponds to circuit block 220*a* that requested performance state 253*a*. Circuit block 220*a* may, after receiving the first acknowledgement signal, proceed to perform a given task that utilizes performance state 253*a* even though power domain 240*a* will further transition into performance state 254*a*.

At block 1220, method 1200 continues with the performance management circuit, in response to determining that the first power domain has entered a performance state indicated by the first field of the second requested state value, sending a second acknowledgement signal to the second circuit block. As described in block 1210, power domain 240*a* may further transition into performance state 254*a*. In response to this transition occurring, performance management circuit 201 may assert a second acknowledgement signal that corresponds to circuit block 220*b* that requested performance state 254*a*. In a similar manner as circuit block 220*a*, circuit block 220*b* may receive the second acknowledgement signal, and proceed to perform a given task that utilizes performance state 254*a*.

Method 1200 continues at block 1230 with the first circuit block storing, prior to receiving the first acknowledgement signal, a third requested state value into the first memory location, wherein the third requested state value includes a different value for the first field. In some embodiments, circuit block 220*a* may be a processor executing software or firmware instructions, such as processor circuit 520 in FIG. 5, executing one processes 585. Accordingly, storing of the first and third requested state values by circuit block 220*a*, may include using software or firmware to generate and write the first and third requested state values to, e.g., register 210*a*. The third requested state value may indicate a request for a different performance state (e.g., performance state 254*a*) for power domain 240*a*. As depicted, circuit block 220*a* still receives the first acknowledgement signal when power domain 240*a* enters performance state 253*a*. Performance management circuit 201 may further assert a third acknowledgement for circuit block 220*a* when power domain 240*a* enters performance state 254*a*. Accordingly, performance management circuit 201 may assert respective acknowledgement signals for a subset of all circuit blocks 220 that requested the current transition to performance state 254*a*.

Circuit block 220*b*, in some embodiments, may not execute software or firmware. Storing of the second requested state value by the second circuit block, therefore, may include using hardware circuits to generate and write the second requested state value to, e.g., register 210*b*. Circuit block 220*b* may be configured to wait for the second acknowledgement signal before storing a different requested state value to register 210*b* to request a different performance state for power domain 240*a*. In other embodiments, circuit block 220*b* may be configured to store a different requested state value to register 210*b* to request a different performance state for power domain 240*a*, but register 210*b* may be configured to reject a change to the first field (e.g., 215*b*) until the second acknowledgement signal has been received.

It is noted that method 1200 includes blocks 1210-1230. Method 1200 may end in block 1230 or may repeat some or all blocks of the method. For example, block 1210 may be repeated to send a third acknowledgement signal to circuit block 220*a* when power domain 240*a* enters performance state 254*a*.

Figure 13:
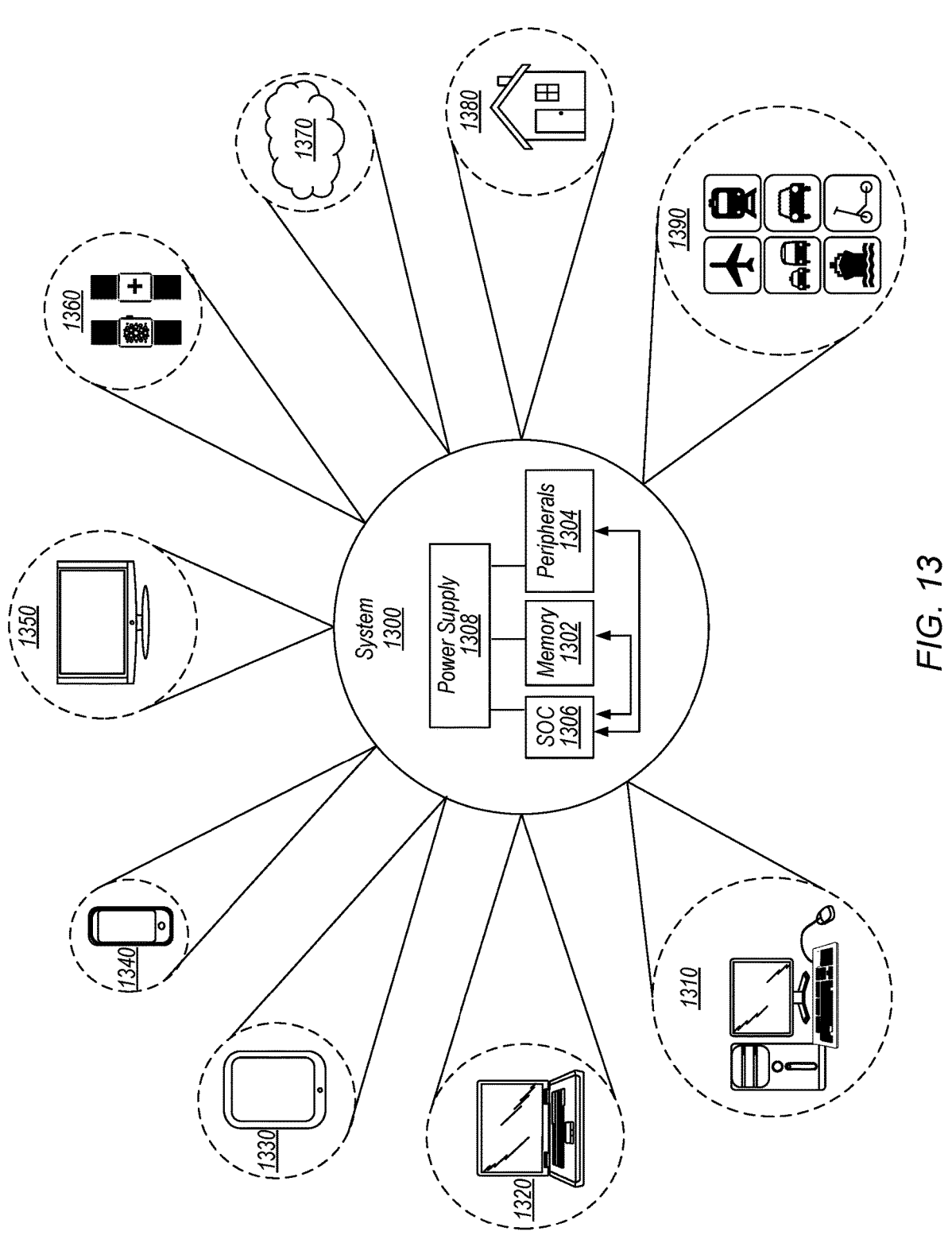
FIG. 13 shows various embodiments of systems that include integrated circuits that utilize the disclosed techniques.

FIGS. 1-12 illustrate circuits and methods for a system, including one or more integrated circuits, that include a performance management circuit in one or more of the integrated circuits. Any embodiment of the disclosed systems may be included in one or more of a variety of computer systems, such as a desktop computer, laptop computer, smartphone, tablet, wearable device, and the like. A block diagram illustrating an embodiment of computer system 1300 is illustrated in FIG. 13. SoC 1306 may, in some embodiments, correspond to any disclosed embodiment of systems 100-700 in FIGS. 1-7.

In the illustrated embodiment, the system 1300 includes at least one instance of a system on chip (SoC) 1306 which may include multiple types of processor circuits, such as a central processing unit (CPU), a graphics processing unit (GPU), or otherwise, a communication fabric, and interfaces to memories and input/output devices. One or more of these processor circuits may correspond to an instance of the processor cores disclosed herein. In various embodiments, SoC 1306 is coupled to external memory circuit 1302, peripherals 1304, and power supply 1308.

A power supply 1308 is also provided which supplies the supply voltages to SoC 1306 as well as one or more supply voltages to external memory circuit 1302 and/or the peripherals 1304. In various embodiments, power supply 1308 represents a battery (e.g., a rechargeable battery in a smart phone, laptop or tablet computer, or other device). In some embodiments, more than one instance of SoC 1306 is included (and more than one external memory circuit 1302 is included as well).

External memory circuit 1302 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 1302 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 1304 include any desired circuitry, depending on the type of system 1300. For example, in one embodiment, peripherals 1304 includes devices for various types of wireless communication, such as Wi-Fi, Bluetooth, cellular, global positioning system, etc. In some embodiments, the peripherals 1304 also include additional storage, including RAM storage, solid state storage, or disk storage. The peripherals 1304 include user interface devices such as a display screen, including touch display screens or multi-touch display screens, keyboard or other input devices, microphones, speakers, etc.

As illustrated, system 1300 is shown to have application in a wide range of areas. For example, system 1300 may be utilized as part of the chips, circuitry, components, etc., of a desktop computer 1310, laptop computer 1320, tablet computer 1330, cellular or mobile phone 1340, or television 1350 (or set-top box coupled to a television). Also illustrated is a smartwatch and health monitoring device 1360. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 1360 are contemplated as well, such as devices worn around the neck, devices attached to hats or other headgear, devices that are implantable in the human body, eyeglasses designed to provide an augmented and/or virtual reality experience, and so on.

System 1300 may further be used as part of a cloud-based service(s) 1370. For example, the previously mentioned devices, and/or other devices, may access computing resources in the cloud (i.e., remotely located hardware and/or software resources). Still further, system 1300 may be utilized in one or more devices of a home 1380 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 13 is the application of system 1300 to various modes of transportation 1390. For example, system 1300 may be used in the control and/or entertainment systems of aircraft, trains, buses, cars for hire, private automobiles, waterborne vessels from private boats to cruise liners, scooters (for rent or owned), and so on. In various cases, system 1300 may be used to provide automated guidance (e.g., self-driving vehicles), general systems control, and otherwise.

It is noted that the wide variety of potential applications for system 1300 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 13 are illustrative only and are not intended to be limiting. Other devices are possible and are contemplated.

As disclosed in regards to FIG. 13, computer system 1300 may include one or more integrated circuits included within a personal computer, smart phone, tablet computer, or other type of computing device. A process for designing and producing an integrated circuit using design information is presented below in FIG. 14.

Figure 14:
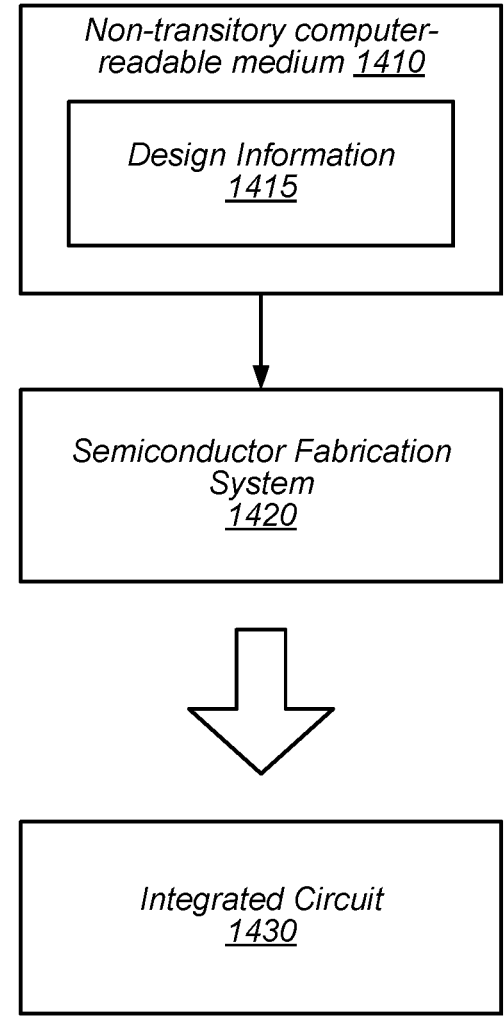
FIG. 14 is a block diagram of an example computer-readable medium, according to some embodiments.

FIG. 14 is a block diagram illustrating an example of a non-transitory computer-readable storage medium that stores circuit design information, according to some embodiments. The embodiment of FIG. 14 may be utilized in a process to design and manufacture hardware integrated circuits, for example, including one or more instances of systems 100-700 shown in FIGS. 1-7. In the illustrated embodiment, semiconductor fabrication system 1420 is configured to process the design information 1415 stored on non-transitory computer-readable storage medium 1410 and fabricate hardware integrated circuit 1430 based on the design information 1415.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system, such as semiconductor fabrication system 1420, for example. In some embodiments, design information 1415 may include a netlist that specifies elements of a cell library, as well as their connectivity. One or more cell libraries used during logic synthesis of circuits included in integrated circuit 1430 may also be included in design information 1415. Such cell libraries may include information indicative of device or transistor level netlists, mask design data, characterization data, and the like, of cells included in the cell library.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown or described herein. Further, integrated circuit 1430 may be configured to perform various functions described herein in conjunction with other components.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system comprising:
a power management processor configured to:
monitor operation of one or more circuit blocks in the system;
determine a particular performance state of a set of performance states for one or more power domains in the system based on the monitored operation; and
a performance management circuit configured to:
receive, from the power management processor, an indication of the particular performance state;
determine a transition path from a current performance state to the particular performance state that avoids illegal performance state transitions, wherein to determine the transition path, the performance management circuit is further configured to:
determine that a particular transition path for a particular power domain includes a given intermediate performance state that is incompatible with a current performance state of a different power domain; and
select a different transition path that avoids the given intermediate performance state; and
cause a control circuit to transition to the particular performance state using the selected transition path.

2. The system of claim 1, wherein an illegal performance state transition includes a restricted performance state for at least one of the one or more circuit blocks currently active in the one or more power domains.

3. The system of claim 1, wherein to monitor the operation of the one or more circuit blocks, the performance management circuit is further configured to receive a respective performance state request from a subset of the one or more circuit blocks, wherein a given performance state request indicates a desired performance state.

4. The system of claim 3, wherein to monitor the operation of the one or more circuit blocks the performance management circuit is further configured to receive a respective bandwidth request from a different subset of the one or more circuit blocks, wherein a given bandwidth request is independent of a given performance state.

5. The system of claim 1, wherein to cause the control circuit to transition to the particular performance state, the performance management circuit is further configured to select a particular voltage level for a power supply signal in a given one of the one or more power domains without informing the power management processor of the selected voltage level.

6. The system of claim 1, wherein the performance management circuit is further configured to:
in response to a determination that a threshold number of the one or more circuit blocks have requested a maximum performance state, delay transition of at least one power domain to the maximum performance state;
transition a power domain currently in the maximum performance state to a lower performance state; and allow the transition of the at least one power domain to the maximum performance state.

7. The system of claim 1, wherein to cause the control circuit to transition to the particular performance state for a given power domain, the performance management circuit is further configured to:

cause a transition of a clock signal associated with the given power domain from a first frequency to a second frequency; and in response to a determination the transition of the clock signal has completed, cause a transition of a power supply signal associated with the given power domain from a first voltage level to a second voltage level.

8. The system of claim 1, wherein the performance management circuit is further configured to:

in response to a determination that an evaluation mode is enabled, track one or more parameters associated with performance state transitions; and provide the one or more parameters to the power management processor.

9. The system of claim 1, wherein the power management processor is further configured to:

compare the particular performance state to a current minimum operating state; and in response to a determination that the particular performance state is lower than the current minimum operating state, select the current minimum operating state.

10. A method comprising:

executing, by a first processor circuit in an integrated circuit (IC), a control loop to monitor performance of a plurality of circuit blocks in the IC;

determining, by the first processor circuit executing the control loop, requested performance states for a plurality of power domains included in the IC;

executing, by a second processor circuit in the IC, firmware that is specific to a given instance of the IC;

identifying, by the second processor circuit based on the firmware, an initial transition path for a given one of the plurality of power domains, wherein the initial transition path includes an intermediate performance state;

determining, by the second processor circuit based on the firmware, that the intermediate performance state is illegal based on current operating conditions of the IC;

selecting, by the second processor circuit based on the firmware, an alternate transition path that avoids the intermediate performance state; and controlling, by the second processor circuit using the alternate transition path, sequencing of performance states among the plurality of power domains within the IC, wherein the sequencing avoids the illegal intermediate performance state.

11. The method of claim 10, wherein determining the requested performance states, includes:

receiving, by the first processor circuit executing the control loop, requested state values from one or more of the plurality of circuit blocks, and wherein a given requested state value indicates a respective requested performance state for one or more of the plurality of power domains; and determining, by the first processor circuit executing the control loop, a highest requested performance state.

12. The method of claim 10, further comprising selecting, by the second processor circuit executing the firmware, a set of operating parameters associated with a particular one of the requested performance states, wherein the set of operating parameters includes a voltage level for a power signal and a frequency for a clock signal, and wherein the set of operating parameters is defined for the particular requested performance state in the firmware that is specific to the given instance of the IC, and wherein the first processor circuit does not have access to the set of operating parameters.

13. The method of claim 10, wherein an illegal performance state transition includes a restricted combination of performance states among a subset of the plurality of power domains.

14. The method of claim 10, wherein monitoring the performance of the plurality of circuit blocks includes:

receiving, by the first processor circuit executing the control loop, a bandwidth request from one of the circuit blocks, wherein the bandwidth request is indicative of a number of transactions to be transferred from the one of the circuit blocks, and wherein a given bandwidth request is independent of a given performance state.

15. The method of claim 10, further comprising:

in response to determining that a number of a group of the circuit blocks requesting a maximum performance state satisfies a threshold number, restricting, by the second processor circuit executing the firmware, transition of at least one power domain of the plurality of power domains to the maximum performance state; and in response to determining that at least one of the group of circuit blocks have subsequently requested a lower performance state, allowing, by the second processor circuit executing the firmware, transition of the at least one restricted power domain to the maximum performance state.

16. An apparatus comprising:

a power management circuit including:

a first computer accessible storage medium storing instructions comprising one or more operating system control loops executable to monitor and manage power and performance in a system, wherein the control loops establish requested performance states for a plurality of power domains in the apparatus;

a first processor configured to execute the one or more operating system control loops;

a second computer accessible storage medium storing instructions comprising firmware that is specific to a given implementation of the system and that controls sequencing of performance states among the plurality of power domains within the apparatus based on the performance states requested by the control loops; and a second processor configured to execute the firmware and control hardware circuitry to perform the sequencing, wherein to execute the firmware and control hardware circuitry, the second processor is further configured to:

identify, based on the firmware, an initial transition path for a given one of the plurality of power domains, wherein the initial transition path includes an intermediate performance state;

determine, based on the firmware, that the intermediate performance state is illegal based on active conditions of the power management circuit; and select, based on the firmware, an alternate transition path that avoids the intermediate performance state.

17. The apparatus of claim 16, wherein performance states include respective combinations of a clock signal frequency and a power signal voltage; and wherein to perform the sequencing, the second processor is further configured to avoid restricted performance states that include an illegal combination of clock signal frequency and a power signal voltage in a given power domain.

18. The apparatus of claim 17, wherein to avoid a restricted performance state in a particular power domain, the second processor is further configured to:

adjust a frequency of a particular clock signal in the particular power domain;

in response to the adjustment of the frequency, adjust a voltage level of a particular power signal in the particular power domain; and in response to the adjustment of the voltage level, readjust the frequency of the particular clock signal in the particular power domain.

19. The apparatus of claim 16, wherein the firmware in the second computer accessible storage medium includes one or more tables that map a given performance state to one or more operating parameters, including at least one clock signal frequency and at least one power signal voltage.

20. The apparatus of claim 16, wherein the second processor is further configured to:

compare a particular requested performance state to a current maximum operating state; and in response to a determination that the particular performance state is higher than the current maximum operating state, select the current maximum operating state.

\* \* \* \* \*